(12) United States Patent
Kumar et al.

(10) Patent No.: US 10,063,701 B2
(45) Date of Patent: Aug. 28, 2018

(54) CUSTOM GRAMMARS BUILDER PLATFORM

(71) Applicant: Angel.com Incorporated, Vienna, VA (US)

(72) Inventors: Praphul Kumar, Falls Church, VA (US); Aaron Wellman, Annandale, VA (US)

(73) Assignee: GENESYS TELECOMMUNICATIONS LABORATORIES, INC., Daly City, CA (US)

(*) Notice: Subject to any disclaimer, the term of this patent is extended or adjusted under 35 U.S.C. 154(b) by 0 days.

(21) Appl. No.: 14/290,446

(22) Filed: May 29, 2014

(65) Prior Publication Data

US 2015/0350429 A1 Dec. 3, 2015

(51) Int. Cl.
| | |
|---|---|
| *H04M 1/64* | (2006.01) |
| *H04M 3/493* | (2006.01) |
| *G10L 15/19* | (2013.01) |
| *G10L 15/22* | (2006.01) |
| *H04M 11/00* | (2006.01) |
| *G10L 15/06* | (2013.01) |

(Continued)

(52) U.S. Cl.
CPC .......... *H04M 3/4936* (2013.01); *G10L 15/19* (2013.01); *G10L 15/22* (2013.01); *G10L 15/183* (2013.01); *G10L 2015/0635* (2013.01); *G10L 2015/0638* (2013.01); *G10L 2015/223* (2013.01); *H04M 3/42382* (2013.01); *H04M 3/4938* (2013.01); *H04M 3/51* (2013.01)

(58) Field of Classification Search
CPC ....... G10L 15/193; G10L 15/22; G10L 15/26; G10L 15/265

USPC ........ 379/88.01–88.19; 704/9, 270, 257, 275
See application file for complete search history.

(56) References Cited

U.S. PATENT DOCUMENTS

| | | |
|---|---|---|
| 6,263,051 B1 | 7/2001 | Saylor et al. |
| 6,587,547 B1 | 7/2003 | Zirngibl et al. |

(Continued)

FOREIGN PATENT DOCUMENTS

KR 1020130104766 A 9/2013

OTHER PUBLICATIONS

U.S. Appl. No. 13/886,205, filed May 2, 2013, Lev-Tov et al.

(Continued)

*Primary Examiner* — Solomon Bezuayehu
(74) *Attorney, Agent, or Firm* — Lewis Roca Rothgerber Christie LLP

(57) ABSTRACT

A request to execute an interaction site associated with a custom grammars file is received from a user device and by a communications system. An interaction flow document to execute the interaction site is accessed by the communications system. The custom grammars file is accessed by the communications system, the custom grammars file being configured to enable the communications system to identify executable commands corresponding to utterances spoken by users of user devices. An utterance spoken by a user of the user device is received from the user device and by the communications system. The utterance is stored by the communications system. The custom grammars file is updated by a grammar generation system to include a representation of the stored utterance for processing utterances in subsequent communications with users.

21 Claims, 20 Drawing Sheets

(51) Int. Cl.
   *G10L 15/183* (2013.01)
   *H04M 3/42* (2006.01)
   *H04M 3/51* (2006.01)

(56) References Cited

U.S. PATENT DOCUMENTS

| | | | |
|---|---|---|---|
| 6,606,596 B1 | 8/2003 | Zirngibl et al. | |
| 6,658,093 B1 | 12/2003 | Langseth et al. | |
| 6,765,997 B1 | 7/2004 | Zirngibl et al. | |
| 6,768,788 B1 | 7/2004 | Langseth et al. | |
| 6,788,768 B1 | 9/2004 | Saylor et al. | |
| 6,798,867 B1 | 9/2004 | Zirngibl et al. | |
| 6,829,334 B1 | 12/2004 | Zirngibl et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,895,084 B1 | 5/2005 | Saylor et al. | |
| 6,940,953 B1 | 9/2005 | Eberle et al. | |
| 6,964,012 B1 | 11/2005 | Zirngibl et al. | |
| 6,977,992 B2 | 12/2005 | Zirngibl et al. | |
| 7,020,251 B2 | 3/2006 | Zirngibl et al. | |
| 7,082,422 B1 | 7/2006 | Zirngibl et al. | |
| 7,197,461 B1 | 3/2007 | Eberle et al. | |
| 7,266,181 B1 | 9/2007 | Zirngibl et al. | |
| 7,272,212 B2 | 9/2007 | Eberle et al. | |
| 7,340,040 B1 | 3/2008 | Saylor et al. | |
| 7,428,302 B2 | 9/2008 | Zirngibl et al. | |
| 7,440,898 B1 | 10/2008 | Eberle et al. | |
| 7,457,397 B1 | 11/2008 | Saylor et al. | |
| 7,486,780 B2 | 2/2009 | Zirngibl et al. | |
| 7,487,094 B1 | 2/2009 | Konig et al. | |
| 8,018,921 B2 | 9/2011 | Pogossiants et al. | |
| 8,041,575 B2 | 10/2011 | Agarwal et al. | |
| 8,117,538 B2 | 2/2012 | Anisimov et al. | |
| 2003/0144843 A1 | 7/2003 | Belrose | |
| 2003/0195739 A1 | 10/2003 | Washio | |
| 2004/0064322 A1* | 4/2004 | Georgiopoulos | G10L 15/26 704/277 |
| 2004/0117804 A1 | 6/2004 | Scahill et al. | |
| 2005/0065796 A1* | 3/2005 | Wyss | G10L 15/30 704/270 |
| 2005/0141679 A1 | 6/2005 | Zirngibl et al. | |
| 2006/0072727 A1* | 4/2006 | Bantz | H04M 3/51 379/201.04 |
| 2007/0250841 A1 | 10/2007 | Scahill et al. | |
| 2007/0286162 A1 | 12/2007 | Fabbrizio et al. | |
| 2008/0065390 A1 | 3/2008 | Ativanichayaphong et al. | |
| 2008/0282160 A1* | 11/2008 | Tonnison | G06F 9/4443 715/704 |
| 2009/0138269 A1 | 5/2009 | Agarwal et al. | |
| 2009/0254817 A1* | 10/2009 | Dreyfus | G06F 17/273 715/257 |
| 2010/0114564 A1 | 5/2010 | Kesireddy | |
| 2010/0161337 A1* | 6/2010 | Pulz | G10L 15/005 704/257 |
| 2011/0224972 A1 | 9/2011 | Millett et al. | |
| 2011/0286586 A1 | 11/2011 | Saylor et al. | |
| 2011/0293078 A1 | 12/2011 | Saylor et al. | |
| 2011/0301943 A1* | 12/2011 | Patch | G10L 15/265 704/9 |
| 2014/0024350 A1 | 1/2014 | Bouzid et al. | |
| 2014/0026075 A1 | 1/2014 | Goller et al. | |
| 2015/0134340 A1* | 5/2015 | Blaisch | G06F 3/04842 704/275 |
| 2015/0261496 A1* | 9/2015 | Faaborg | G06F 3/167 715/728 |

OTHER PUBLICATIONS

U.S. Appl. No. 14/193,407, filed Feb. 28, 2014, Vymenets.
International Search Report dated Aug. 2, 2011 in International Application No. PCT/US2011/033505, 2 pages.
Written Opinion of the International Searching Authority dated Aug. 2, 2011 in International Application No. PCT/US2011/033505, 9 pages.
PCT Notification Concerning Transmittal of International Preliminary Report on Patentability for Application No. PCT/US2011/033505 dated Oct. 23, 2012, 11 pages.
U.S. Non-Final Office Action for U.S. Appl. No. 13/092,090 dated May 9, 2013, 12 pages.
U.S. Non-Final Office Action for U.S. Appl. No. 13/092,101 dated Mar. 11, 2013, 12 pages.
U.S. Notice of Allowance for U.S. Appl. No. 13/092,101 dated Jul. 12, 2013, 11 pages.
U.S. Notice of Allowance for U.S. Appl. No. 13/092,090 dated Oct. 9, 2013, 13 pages.
Bellman, "Dynamic programming," Princeton University Press, 1957, pp. 169-199.
Brown et al., "Class-based n-gram models of natural language," J Computational Linguistics, 1992, 18(4):467-479.
International Search Report and Written Opinion of the International Searching Authority for Application No. PCT/US2015/033358, dated Aug. 31, 2015, 13 pages.

\* cited by examiner

FIG. 2C

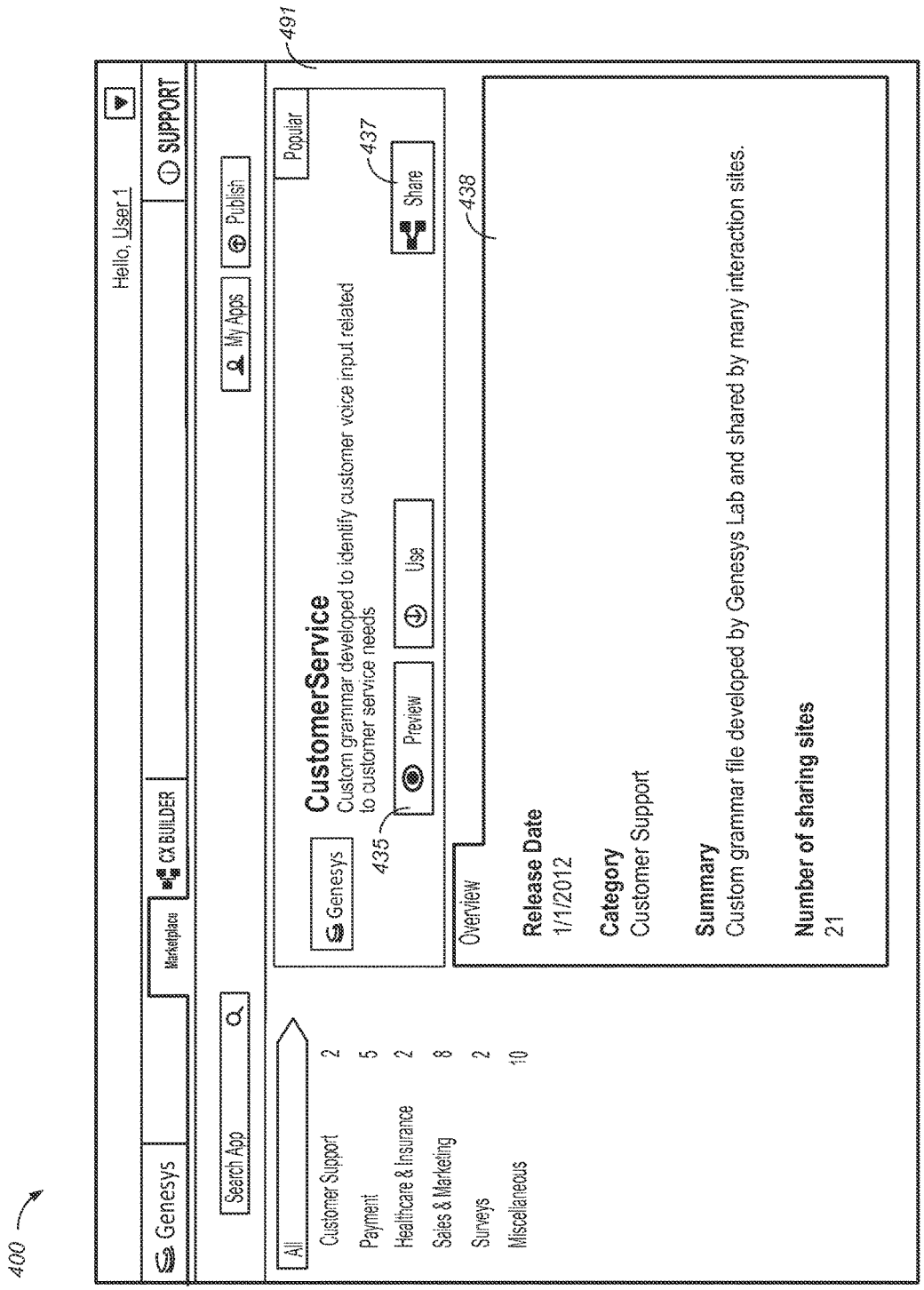

FIG. 4G

CUSTOM GRAMMARS BUILDER PLATFORM

TECHNICAL FIELD

The following disclosure relates generally to the development and delivery of a multi-channel interaction application.

BACKGROUND

A developer may develop an application that uses custom grammars to allow a user to use a personal communications device to contact a company to discuss a service or a product provided by the company. Developers may develop and share applications and/or custom grammars over an application builder platform.

SUMMARY

In a general aspect, a request to execute an interaction site associated with a custom grammars file is received from a user device and by a communications system, the interaction site enabling communications between the user device and the communications system over any of multiple communications channels, including an interactive voice response (IVR) channel. An interaction flow document to execute the interaction site is accessed by the communications system. The custom grammars file is accessed by the communications system, the custom grammars file being configured to enable the communications system to identify executable commands corresponding to utterances spoken by users of user devices. An utterance spoken by a user of the user device is received, from the user device and by the communications system. The utterance is stored by the communications system. The custom grammars file is updated by a grammar generation system to include a representation of the stored utterance for processing utterances in subsequent communications with users.

Implementations may include one or more of the following features. For example, to update the custom grammars file, the custom grammars file may be stored in a grammar database, the custom grammars file in the grammar database being accessible to one or more communications systems executing one or more interaction sites associated with the custom grammars file.

A request to execute a second interaction site associated with the custom grammars file may be received, from a second user device and by the communications system. The custom grammars file in the grammar database may be accessed by the communications system, the custom grammars file being updated by the grammar generation system to include the representation of the utterance.

To update the custom grammars file, a private custom grammars file for the interaction site may be generated by the grammar generation system. The private custom grammars file may be stored in a grammar database, the private custom grammars file being accessible to one or more communications systems executing the interaction site associated with the custom grammars file and not being accessible to one or more communications systems executing other interaction sites associated with the custom grammars file.

To receive a request to execute an interaction site, a first request to execute a first interaction page of the interaction site may be received, where the first interaction page is associated with the custom grammars file. A second request to execute a second interaction page of the interaction site may be received, where the second interaction page is associated with a second custom grammars file.

To store the utterance, a transcribed utterance may be generated using the utterance spoken by the user. A command associated with the transcribed utterance is not recognized by the communications system using the custom grammars file may be determined. In response to determining that the command is not recognized by the communications system using the custom grammars file, the utterance may be stored.

The custom grammars file may include GRXML scripts configured to identify a command associated with the utterance spoken by the user. The interaction flow document may include XML scripts that correspond to interaction pages of the interaction site. The multiple communications channels may include at least one of a SMS channel, a chat channel, and an email channel.

In another general aspect of a system includes one or more processors and one or more non-transitory computer-readable storage devices storing instructions that, when executed by the one or more processors, cause the one or more processors to perform operations including receiving, from a user device, a request to execute an interaction site associated with a custom grammars file, the interaction site enabling communications between the user device and a communications system over any of multiple communications channels, including an interactive voice response (IVR) channel; accessing an interaction flow document to execute the interaction site; accessing the custom grammars file, the custom grammars file being configured to enable the communications system to identify executable commands corresponding to utterances spoken by users of user devices; receiving, from the user device, an utterance spoken by a user of the user device; storing the utterance; and updating the custom grammars file to include a representation of the stored utterance for processing utterances in subsequent communications with users.

The operations may include storing the custom grammars file in a grammar database, the custom grammars file in the grammar database being accessible to one or more communications systems executing one or more interaction sites associated with the custom grammars file. The operations may also include receiving, from a second user device, a request to execute a second interaction site associated with the custom grammars file; and accessing the custom grammars file in the grammar database, the custom grammars file being updated to include the representation of the utterance.

The operations may include generating a private custom grammars file for the interaction site. The operations may further include storing the private custom grammars file in a grammar database, the private custom grammars file being accessible to one or more communications systems executing the interaction site associated with the custom grammars file and not being accessible to one or more communications systems executing other interaction sites associated with the custom grammars file.

The operations may include generating a private custom grammars file for the interaction site; and the operations further comprise storing the private custom grammars file in a grammar database, the private custom grammars file being accessible to one or more communications systems executing the interaction site associated with the custom grammars file and not being accessible to one or more communications systems executing other interaction sites associated with the custom grammars file.

The operations may include generating a transcribed utterance using the utterance spoken by the user; determining that a command associated with the transcribed utterance is not recognized by the communications system using the custom grammars file; and in response to determining that the command is not recognized by the communications system using the custom grammars file, storing the utterance.

In another general aspect of a system includes a communications system configured to receive, from a user device, a request to execute an interaction site associated with a custom grammars file, the interaction site enabling communications between the user device and the communications system over any of multiple communications channels, including an interactive voice response (IVR) channel; access an interaction flow document to execute the interaction site; access the custom grammars file, the custom grammars file being configured to enable the communications system to identify executable commands corresponding to utterances spoken by users of user devices; receive, from the user device, an utterance spoken by a user of the user device; and store the utterance. The system further includes a grammar generation system configured to update the custom grammars file to include a representation of the utterance stored by the communications system for processing utterances in subsequent communications with users.

The system may further include a user device configured to send the request to the communications system to execute the interaction site associated with the custom grammars file; and send the utterance spoken by the user to the communications system. The system may further include a second user device configured to send a request to the communications system to execute a second interaction site associated with the custom grammars file. The communications system may further be configured to update the custom grammars file by storing the custom grammars file in a grammar database, the custom grammars file in the grammar database being accessible to one or more communications systems executing one or more interaction sites associated with the custom grammars file; receive, from the second user device, the request to execute the second interaction site associated with the custom grammars file; and access the custom grammars file in a grammar database, the custom grammars file being updated by the grammar generation system to include the representation of the utterance.

The details of one or more implementations are set forth in the accompanying drawings and the description below. Other potential features and advantages will become apparent from the description, the drawings, and the claims.

BRIEF DESCRIPTION OF THE FIGURES

FIGS. 2A-2E illustrate a GUI for an application development platform that recommends artifacts to content providers for application development.

FIGS. 4A-4G illustrate a GUI for an application development platform that is used by a content provider to create an interaction site capable of accessing custom grammars.

DETAILED DESCRIPTION

Figure 1:
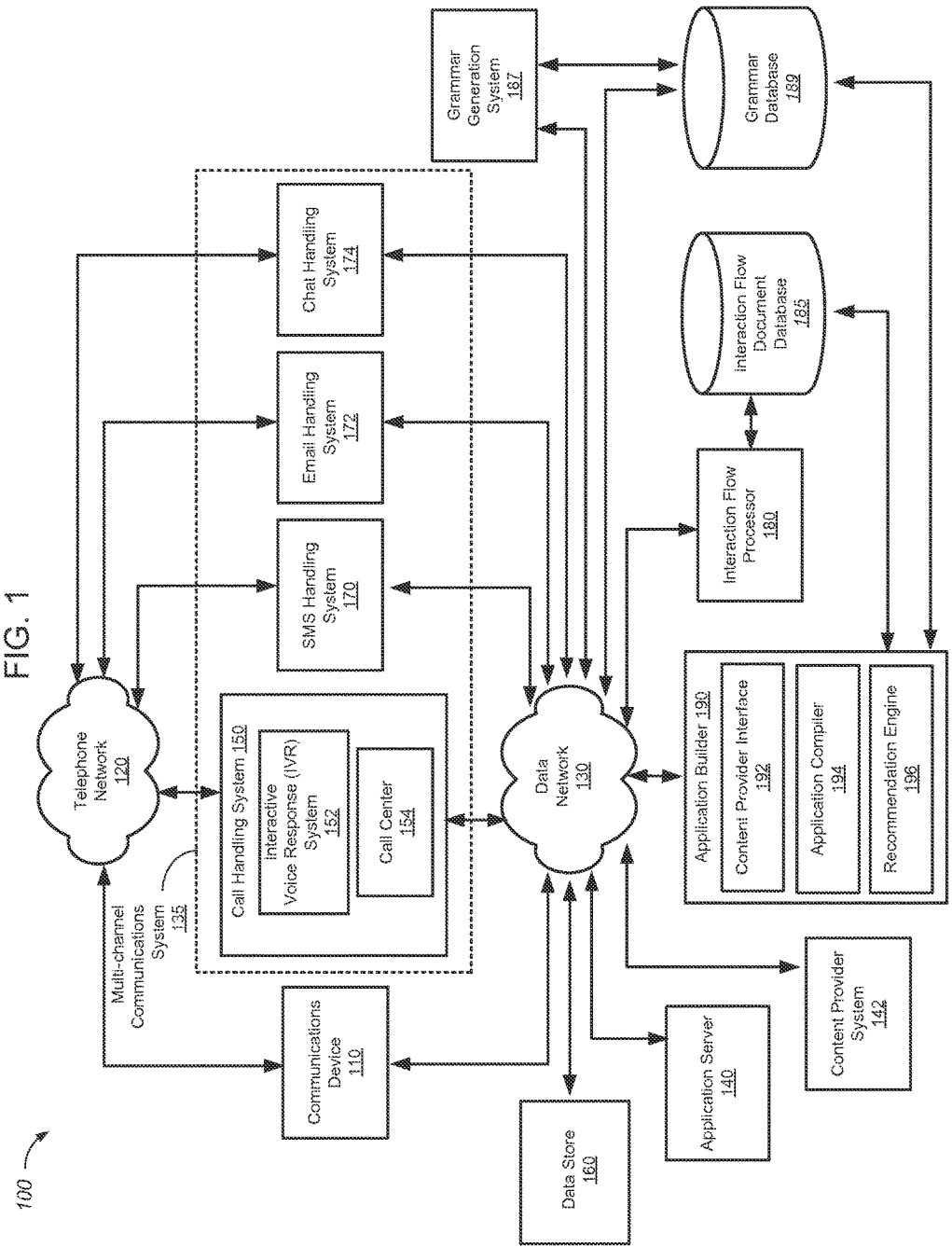
FIG. 1 is a block diagram of a communications system that enables development of interaction sites and access to interaction sites in a multi-channel solution platform.

A company may wish to enable its customers to contact it through use of any of multiple different communications channels (e.g., phone, email, chat, SMS or another communications channel that supports communications between a customer and a service/product provider). To save costs, the company may wish to interact with the customers, at least initially, using an automated response system. Use of such an automated response system may decrease the costs associated with responding to customer contacts by decreasing the number of human agents that need to be employed to respond to the customer contacts. Many customer contacts are for routine inquiries (e.g., a customer contacts the company to check the balance of a checking account or of a credit card) and, therefore, lend themselves well to being efficiently and cost-effectively handled through use of an automated response system. In contrast, more complex customer contacts, which are typically far fewer in number, may be routed to human agents for handling.

The interaction between a customer and an automated response system may be designed by a content provider offering the service using an interaction flow that segments the interaction into multiple discrete steps. For example, when a customer dials a company's telephone number to pay a bill, a voice interaction flow may include the steps of (i) acquiring the customer's account number, (ii) informing the customer of a current balance, (iii) acquiring the customer's payment information, (iv) processing payment, and (v) conducting a customer satisfaction survey. Each of the above automated steps may be implemented using artifacts. In this application, an artifact, a construct, or a building block may be used interchangeably, and an artifact refers to a computer program, a portion of a computer program, or computer software code configured to perform a specific function. For example, an interaction site that is configured to specify a multi-step communication flow between a user and an automated response system may be an artifact. As another example, an interaction page that is configured to perform a step of the multi-step communication flow may be an artifact. In an application development ecosystem where there are many developers and content providers, many of the steps in an interaction flow may have already been developed by another developer or content provider. For example, multiple developers may have developed various artifacts for recognizing a caller's credit card number by voice, and processing the payment. One artifact may be implemented to recognize a special accent, while another artifact may be implemented to recognize a specific language. It may be useful to provide developers an application builder platform that offers the ability and flexibility to download, share, design, and develop artifacts for communications interactions.

In any one step of a multi-step communication flow, the content provider may define a particular type of grammars to be used by the automated response system to identify the need of a customer based on the customer's voice input. In general, complex grammars may be more costly to develop and may require more computing resources to process. For example, in a step of acquiring the customer's account number, simple grammars may be used to interpret numbers and/or alphabets spoken by the customer. As another example, in a step of receiving a general inquiry from a customer and then directing the customer to the appropriate department based on this general inquiry, complex natural language grammars may be used to resolve the customer's input having a broader range of potential outcomes. By choosing the natural language grammars over the simple grammars, the content provider may enable more complex spoken commands to be processed by the automated response system during runtime of the interaction site, at the expense of higher runtime cost for the content provider for using the service provider's resources to perform the complex processing.

In general, an application builder platform may provide a list of predefined grammars types (i.e., grammars files) for the developers to select. If the scope of a default grammars type (e.g., identify numbers) meets the scope of a particular step, the developers may simply select the predefined grammars when developing the particular step. However, in many cases, the developers need custom grammars, or customized grammars, to satisfy their specific application requirements. For example, a particular interaction page in a pharmacy interaction site may require custom grammars that can recognize hundreds of different types of prescribed medicine. As another example, a particular interaction page in a pizza-ordering interaction site may require custom grammars that can recognize names of specific toppings (e.g., pepperoni, mushroom, green peppers, etc.) and/or names of specialty pizza (e.g., supreme pizza). As another example, a particular interaction page for determining whether to route a customer's request to a human agent may require custom grammars that include many different ways to say "I would like to speak to a customer representative." Custom grammars may be defined using programming languages known in the art. For example, GRXML scripting language may be used to define custom grammars. In some implementations, custom grammars may be defined using a proprietary programming language provided by the service provider. In some implementations, custom grammars may be defined using a GUI interface provided by the service provider, where the application builder platform may compile the parameters entered by the content provider into another language that can be processed by the communications system.

In general, as more customer utterances are received and processed by the automated response system, new grammars may be developed over time. For example, for the pharmacy interaction site, new prescription drugs may be introduced to the market every month, and the customers may try to ask about these new prescription drugs during their communications sessions. As another example, different customers have different ways of saying "I would like to speak to a customer representative." The automated response system may collect those utterances that cannot be recognized by the custom grammars. Based on the newly collected utterances, additional custom grammars may be developed to update the existing custom grammars, such that more relevant commands can be recognized over time.

In the application development ecosystem where there are many developers and content providers, it may be advantageous for a content provider to share its developed custom grammars with another content provider over the application builder platform. For example, in the previous example where the custom grammars include many different ways to say "I would like to speak to a customer representative," the custom grammars can be equally leveraged by a banking interaction site and a product-servicing interaction site. Different interaction sites may capture different customer utterances over time. These utterances can then be collectively developed into new grammars. This potential scaling of custom grammars achieved by the sharing model may be advantageous for content providers that have developed custom grammars files to handle specific tasks, but lack the sufficient customer base to grow the custom grammars file over time.

Moreover, in addition to presenting the predefined grammars types to a developer, the application builder platform may also recommend one or more custom grammars files to the developer based on the developer's profile and/or attributes associated with the artifact. For example, if the application builder platform determines that the interaction page being developed is related to taking pizza toppings as input, the application builder platform may recommend a custom grammars file configured to perform this task to the developer. This may be advantageous because the recommendation may help reduce development cost for the content providers.

For ease of exposition, the following description begins by describing a voice site, which is configured to receive and respond to telephone contacts, and then expands the description to cover an interaction site that supports contacts over any one of multiple different communication channels (e.g., email contacts, chat contacts, and SMS contacts). Note that an artifact is not limited to an interaction site or an interaction page, and may include any building block that facilitates interactions between a user and a communications system.

A user of a particular product or service provided by the company may need to contact customer service for the product or service to troubleshoot a problem the user is experiencing in using the product or service. In order to contact the customer service and obtain a solution to the problem, the user may call a known customer service number for the product or service. By calling the customer service number, the user may get connected to a call handling system that enables the user to interact with a voice site associated with the product or service.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. Because customers typically access a voice site by calling a telephone number using a telephone, a standard voice site is typically referred to as a single channel interaction site, i.e., an interaction site that supports a single type of contact. An enhanced voice site may include scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). An enhanced voice site may, therefore, be referred to as a single channel interaction site that has been enhanced to enable some portions of the interaction flow to involve the communication of multimedia information. Notably, a call may be said to be directed to a voice site if it is directed to a telephone number that has been defined as corresponding to the voice site.

The voice site called by the user may be an automated interactive voice site that is configured to process, using pre-programmed scripts, information received from the user that is input through the telephonic device being used by the user, and, in response, provide information to the user that is conveyed to the user through the telephonic device. The interaction between the user and the voice site may be done using an interactive voice response system (IVR) provided by a service provider that is hosting the voice site. The IVR is configured to support voice commands and voice information using text-to-speech processing and natural language processing by using scripts that are pre-programmed for the voice site, for example, voice-extensible markup language (VoiceXML) scripts. The IVR interacts with the user by using audible commands to prompt the user to provide information and enabling the user to input the information by speaking into the telephonic device or by pressing buttons on the telephonic device (when using, for example, a touch-tone telephone). The information input by the user is conveyed to the IVR over a voice communications session that is established between the telephonic device and the IVR when the call is connected. Upon receiving the information, the IVR processes the information using the pre-programmed scripts. The IVR may be configured to send audible responses back to the user via the telephonic device.

In some implementations, the voice site may be an enhanced voice site that is configured to support multimedia information including audio, video, images and text. The telephonic device also may be an advanced telephonic device (e.g., a smart phone) provided with a display for conveying visual information to the user, and a processor capable of performing complex tasks such as logic processing where the associated instructions may be stored in memory included in the telephonic device. In such circumstances, the advanced telephonic device and the enhanced voice site can interact using one or more of voice, video, images or text information and commands.

As noted previously, a customer typically accesses a voice site by calling a telephone number using a telephone. A voice site, therefore, is a single channel interaction site in that it receives and responds to contacts that are telephone calls. In contrast, a multi-channel interaction site receives and responds to contacts in an automated fashion received via any one of multiple different communications channels supported by a multi-channel communications system/platform. For example, a multi-channel interaction site may receive and respond to contacts that are telephone calls, email messages, SMS messages, and/or chat messages. Moreover, the multi-channel interaction site may provide the same interaction flow with the customer irrespective of which channel was used by the customer to initially contact the site. For example, the same or substantially the same interaction flow may be used for enabling the customer to access their bank account information and perform banking transactions, irrespective of which type of contact is used by the customer to contact the bank's automated response system.

Interacting with a multi-channel interaction site may be useful in several situations. A multi-channel interaction site allows the user to receive the same service, independent of how the user wishes to contact the company associated with the multi-channel interaction site and independent of the device that the user wishes to use when contacting the company. For example, if the user is operating a telephonic device but does not wish to talk to a person or a machine, the user may contact customer service for the same product or service via short message service (SMS) using a short code and a keyword. As another example, if the user is operating a laptop computer or other types of communications devices, the user may contact customer service for the same product or service via a chat room using a hyperlink or a website address. As another example, if the user does not have time to complete the entire service transaction in one continuous session, the user may contact customer service for the same product or service via an email and interact with the customer service via the subsequent communication of one or more emails or, alternatively, one or more instant messages or chat messages.

An interaction site accessed by the user may be an automated interaction site that is configured to process, using pre-programmed scripts, information received from the user that is input through the communications device being used by the user via the communications channel used by the user to contact (i.e., initially contact) the site. The interaction site may, in response, provide information to the user that is conveyed to the user through the communications device via the same communications channel. A standard interaction site limits the interaction with the customer to the mode of communications associated with the communications channel used by the customer to contact the site. A standard interaction site is a set of scripts or, more generally, programming language modules corresponding to one or more linked interaction pages that collectively interoperate to produce an automated interactive experience with a user. A standard interaction site may be either a single channel interaction site (e.g., a standard voice site), which receives and responds to contacts received over a single channel, or a multi-channel interaction site, which receives and responds to contacts received over any of multiple different channels.

In contrast, an enhanced interaction site may include scripts or programming language modules corresponding to at least one interaction page and at least one multimodal action page linked to the at least one interaction page that enable interaction with the user to occur via the communications mode used by the user to initially contact the site (e.g., an audio communications mode for a telephone call contact) and at least one additional communications mode (e.g., a text communications mode, an image communications mode or a video communications mode). An enhanced interaction site may, therefore, be either a single channel interaction site (e.g., an enhanced voice site) or a multi-channel interaction site that has been enhanced to enable some portions of the interaction flow to involve the communication of multimedia information.

The interaction between the user and the interaction site may be done using a sub-system directed to servicing a particular communications channel (e.g., an IVR, which is directed to servicing telephone call contacts) in a multi-channel communications system provided by a service provider that is hosting the interaction site. Each sub-system in the multi-channel communications system may be configured to support a particular communications channel, and to process commands and information by using scripts or programming modules that are translated from pre-programmed scripts or programming modules that constitute the interaction site. That is, an interaction site may be a set of scripts or programming modules that offer a common interaction flow for handling contacts received over different channels. The set of scripts or programming modules may then be translated by an interaction flow processor into a corresponding set of channel-specific scripts or programming modules for each channel supported by the interaction site, and these translated channel-specific scripts or programming modules may then be executed by the respective sub-systems of the multi-channel communications system to enable automated interactions with users over the different channels. For example, the pre-programmed scripts of the interaction site may be extensible markup language (XML) scripts. If the user accesses the multi-channel communications system by using a telephone to call a telephone number associated with the interaction site, the interaction flow processor may translate the XML scripts of the interaction site to VoiceXML scripts for processing by an IVR to interact with the calling user.

The interaction site may be hosted by a third party service provider that facilitates the creation and hosting of interaction sites on servers owned and operated by the service provider. The service provider may provide a service/method that enables the design, development, and hosting of interaction sites or applications that run a thin client on the communications device that interacts with a fully hosted, on-demand interaction solution platform maintained and managed by the service provider. The service/method provides a way to develop an interaction site that is supported by a multi-channel communications system (the server side) and allows a communications interaction between the client and the server to be established via any one of the communications channels supported by the interaction site. In some implementations, the service/method may require an installation of a thin client engine (e.g., an application) on the communications device of the user that mediates between the objects and devices in the communications device and the multi-channel communications system supporting the interaction site hosted by the service provider.

In the above scenario, the role of the entity providing customer service through the interaction site is that of a content provider. The developer of the entity/company (hereinafter referred to interchangeably as the "content provider") configures the interaction site that is to be used for the particular product or service and provides the logic for the interaction site that is to be executed by the multi-channel communications system. The content provider may do so by using a graphical user interface (GUI) provided by the third party service provider for configuring the interaction site. The service provider handles the interpretation and compilation of the information provided by the content provider, and the creation and hosting of the interaction site based on the information. Since the service provider manages the multi-channel communications system, the service provider may allow the content provider to develop the interaction site using one unified GUI interface, where the interaction site is executable by the user via any one or more of multiple different communications channels.

The service/method thus enables the deployment of interaction-enabled solutions on communications devices without requiring the content provider to engage in complex programming. Applications, or interaction sites, may be designed by the content provider using a web-based or remotely accessible interface, and served on demand to clients. In some implementations, clients can be add-ons that smart phone applications can plug into. In some implementations, the service/method enables users to interact with a multi-channel application. The application is referred to as multi-channel in that it enables users to contact and interact with a multi-channel interaction platform via any of multiple different communications channels (e.g., phone, email, chat, Short Message Service (SMS), or another communications channel that supports communications between the user and the interaction site). For example, the user may contact the multi-channel platform (e.g., by phone) and provide information to the multi-channel platform by speaking and may receive information from the multi-channel platform by hearing. Alternatively, the user may instead choose to contact the multi-channel platform (e.g., by SMS, chat room, or email) and provide the same information to the multi-channel platform by typing text and receive the same information from the multi-channel platform by reading text.

FIG. 1 is a block diagram of a communications system 100 that provides a development platform for interaction sites and access to these interaction sites in a multi-channel solution platform. Referring to FIG. 1, a user of a communications device (i.e., a smart phone) 110 is able to interact with the communications device 110 to request a service from an interaction site that is provided, for example, by a content provider. The service may be, for example, a request to purchase a particular product or service offered by or made available by the content provider through the interaction site. For example, the user may indicate a desire to request a service from the interaction site by selecting a graphically displayed icon on a graphical user interface (GUI) of the communications device 110 to thereby invoke an application stored in the communications device 110 with which the user can interact to initiate a service request. Additionally or alternatively, the user may indicate a desire to request a service by inputting, via manual selection or otherwise, a telephone number associated with the customer service department into the communications device 110 and initiating a call directed to the inputted telephone number. Additionally or alternatively, the user may indicate a desire to request a service by inputting and sending, via manual selection or otherwise, a SMS message that includes a short code and a keyword associated with the customer service department into the communications device 110. Additionally or alternatively, the user may indicate a desire to request a service by inputting, via manual selection or otherwise, a uniform resource locator (URL) associated with the customer service department into the communications device 110 to initiate a chat session with the customer service department. Additionally or alternatively, the user may indicate a desire to request a service by inputting and sending, via manual selection or otherwise, an email that includes an email address associated with the customer service department into the communications device 110. Additionally or alternatively, the user may indicate a desire to request a service via a communications channel not listed in the above examples.

In some implementations, the request for the service or product may be directed to a multi-channel communications system 135, and an interaction site may be invoked, where the multi-channel communications system 135 communicates with the communications device 110 to provide the requested service. As mentioned previously, an interaction site may be hosted by a third party service provider that facilitates the creation and hosting of interaction sites on servers owned and operated by the service provider. To create an interaction site, an interaction flow defining the steps for providing a service to the user may be developed by a content provider hosting the interaction site. For example, a call handling system may present the interaction site to the user using voice messages that are generated by VoiceXML scripts. As another example, a SMS handling system may present the interaction site to the user using SMS messages that are generated by XML scripts.

However, in many applications, the flow for providing a service to the user includes the same or similar steps. For example, an interaction site providing users to shop for clothing and another interaction site providing users to order pizza may both require steps for taking payment information from the users. As another example, many interaction sites may include steps for taking a user satisfaction survey on the experience. From a content provider's perspective, it is a burden to require developing each step of an interaction site from scratch, when the function defined by a particular step may have already been developed by other developers in same or different service areas. Accordingly, a communications system that can provide an application builder platform that offers template interaction sites and/or recommendations for the template interaction sites to a content provider based on its needs may enable a content provider to enjoy a decrease in costs and development time associated with developing interaction sites. Moreover, while the content provider is configuring an interaction site, an application builder platform that provides dynamic recommendations of interaction pages for further refining the interaction site may enable a content provider to enhance the quality of the interaction site with greater design flexibility.

Moreover, custom grammars enable the content providers to define grammars suitable for those steps of the interaction flow that are used to process audible input provided or spoken by a user. A communications system that can provide an application builder platform that offers sharing and/or adopting of custom grammars to a content provider based on its needs may enable a content provider to further enjoy a decrease in costs and development time associated with developing interaction sites. Similarly, while the content provider is configuring an interaction page, an application builder platform that provides dynamic recommendations of custom grammars for meeting the content provider's needs may enable the content provider to enhance the quality of the interaction page/site with further design flexibility.

The communications system 100 is an example implementation of a system that supports an interactive multi-channel delivery platform. In general, the communications system 100 includes the communications device 110, a telephone network 120, a data network 130, the multi-channel communications system 135, a content provider system 142, an interaction flow processor 180, an interaction flow document database 185, a grammar generation system 187, a grammar database 189, and an application builder 190. The communications system 100 may additionally include an application server 140, and a data store 160.

The communications device 110 is configured to allow a user to interact with the multi-channel communications system 135 across the telephone network 120 and/or across the data network 130. The communications device 110 may be a cellular phone or a mobile personal digital assistant (PDA) with embedded cellular phone technology. The communications device 110 may be a computer that includes one or more software or hardware applications for performing communications between the communications device 110 and the multi-channel communications system 135. The communications device 110 may have various input/output devices with which a user may interact to provide and receive audio, text, video, and other forms of data.

The telephone network 120 may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The data network 130 is configured to enable direct or indirect communications between the communications device 110, the multi-channel communications system 135, and/or the application server 140. Examples of the data network 130 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. In some implementations, the data network 130 and the telephone network 120 are implemented by a single or otherwise integrated communications network configured to enable communications between the communications device 110 and the multi-channel communications system 135.

A multi-channel communications system 135 receives the request and interacts with the communications device 110 to provide the requested service through the interaction site. The multi-channel communications system 135 may include a call handling system 150, a SMS handling system 170, an email handling system 172, and a chat handling system 174.

The call handling system 150 is configured to handle a request to interact with an interaction site using a voice channel. The call handling system 150 may include an IVR system 152 configured to receive a call from the communications device 110 when the communications device 110 is operating under a voice communications channel. In some implementations, the call handling system 150 may additionally include a call center 154.

The IVR 152 may include a voice gateway coupled to an interaction flow processor 180 via a data network. Alternatively, the voice gateway may be local to the interaction flow processor 180 and connected directly to the interaction flow processor 180. The voice gateway is a gateway that receives user calls from or places calls to voice communications devices, such as the communications device 110, and responds to the calls in accordance with a voice program that corresponds to a flow of an interaction site. The voice program may be accessed from local memory within the voice gateway or from the interaction flow processor 180. In some implementations, the voice gateway processes voice programs that are script-based voice applications. The voice program, therefore, may be a script written in a scripting language such as, for example, voice extensible markup language (VoiceXML) or speech application language tags (SALT). The IVR 152 may also be configured to communicate with the data store 160 to read and/or write user interaction data (e.g., state variables for a data communications session) in a shared memory space.

The call center 154 of the call handling system may include, among other components, an inbound call queue, an outbound call request queue, a call router, an automatic call distributor ("ACD") administrator, and a plurality of call center agents. The call center 154 may receive one or more calls from one or more voice communication devices, such as the communications device 110, via the telephone network 120 and may make one or more outbound calls to voice communication devices via the telephone network 120. The call center 154 may determine an appropriate call center agent to route the call to or to assign an outbound call to. The determination of an appropriate agent may be based on agent performance metrics and information known about the inbound or outbound call. The determination of the appropriate agent may, for example, be based on some or all of the form information and/or other optional information received from the communications device 110.

The SMS handling system 170 is configured to handle a request to interact with an interaction site using a SMS channel. The SMS handling system 170 may include a SMS gateway coupled to an interaction flow processor 180 via a data network. Alternatively, the SMS gateway may be local to the interaction flow processor 180 and connected directly to the interaction flow processor 180. The SMS gateway is a gateway that receives user SMS messages from or places SMS messages to communications devices, such as the communications device 110, and responds to the SMS messages in accordance with a SMS program that corresponds to a flow of an interaction site. The SMS program may be accessed from local memory within the SMS gateway or from the interaction flow processor 180. In some implementations, the SMS gateway processes voice programs that are script-based SMS applications. The SMS program, therefore, may be a script written in a scripting language such as, for example, extensible markup language (XML). The SMS handling system 170 may also be configured to communicate with the data store 160 to read and/or write user interaction data (e.g., state variables for a data communications session) in a shared memory space.

The email handling system 172 is configured to handle a request to interact with an interaction site using an email channel. The email handling system 172 may include an email gateway coupled to an interaction flow processor 180 via a data network. Alternatively, the email gateway may be local to the interaction flow processor 180 and connected directly to the interaction flow processor 180. The email gateway is a gateway that receives user emails from or places emails to communications devices, such as the communications device 110, and responds to the emails in accordance with an email program that corresponds to a flow of an interaction site. The email program may be accessed from local memory within the email gateway or from the interaction flow processor 180. In some implementations, the email gateway processes email programs that are script-based email applications. The email program, therefore, may be a script written in a scripting language such as, for example, extensible markup language (XML). The email handling system 172 may also be configured to communicate with the data store 160 to read and/or write user interaction data (e.g., state variables for a data communications session) in a shared memory space.

The chat handling system 174 is configured to handle a request to interact with an interaction site using a chat channel. The chat handling system 174 may include a chat gateway coupled to an interaction flow processor 180 via a data network. Alternatively, the chat gateway may be local to the interaction flow processor 180 and connected directly to the interaction flow processor 180. The chat gateway is a gateway that receives user message from or places messages in a chat session to communications devices, such as the communications device 110, and responds to the messages in accordance with a chat program that corresponds to a flow of an interaction site. The chat program may be accessed from local memory within the chat gateway or from the interaction flow processor 180. In some implementations, the chat gateway processes chat programs that are script-based email applications. The chat program, therefore, may be a script written in a scripting language such as, for example, extensible markup language (XML). The chat handling system 177 may also be configured to communicate with the data store 160 to read and/or write user interaction data (e.g., state variables for a data communications session) in a shared memory space.

The interaction flow processor 180 includes all hardware and software components that interface and provide data to the multi-channel communications system 135. Depending on the communications channel between the user of the communications device 110 and the multi-channel communications system 135, the interaction flow processor 180 sends translated application programs or scripts to the multi-channel communications system 135 for processing user interactions. The user interactions are analyzed by the multi-channel communications system 135 and new programs or scripts that correspond to the next state of the interaction flow may then be sent to the multi-channel communications system 135 for further processing. In some implementations, the interaction flow processor 180 may determine which programs or scripts to provide to the multi-channel communications system 135 based on some or all of the information received from the multi-channel communications system 135 or the communications device 110.

The interaction flow document database 185 stores interaction flow documents created by the application builder 190, and provides the interaction flow processor 180 access to these interaction flow documents. In some implementations, the interaction flow document database 185 may be an array of high-capacity storage drives that are closely coupled to the interaction flow processor 180. In some implementations, the interaction flow document database 185 may be an array of high-capacity storage drives that are closely coupled to the application builder 190.

The content provider system 142 is configured to allow a content provider to interact with the application builder 190 across the data network 130. The content provider system 142 may be a cellular phone or a mobile personal digital assistant (PDA) with embedded cellular phone technology. The content provider system 142 may be a computer that includes one or more software or hardware applications for performing communications between content provider system 142 and the application builder 190. The content provider system 142 may have various input/output devices with which a content provider may interact to provide and receive audio, text, video, and other forms of data from the application builder 190.

The application builder 190 facilitates the creation of interaction sites. The application builder 190 utilizes various components to enable the creation of interaction sites. The various components of the application builder 190 may be co-located in a single physical location, or they may be geographically distributed, with dedicated high capacity links interconnecting the various components. The application builder 190 may include a content provider interface 192 and an application compiler 194.

The content provider interface 192 is a GUI front-end for an application development tool that can be used to build an interaction site that is capable of handling interactions using multiple communications channels. The content provider may access the content provider interface 192 over the data network 130. For example, the content provider may use a web browser that runs on the content provider system 142. By accessing the application development tool using the content provider interface 192, the content provider may create interaction sites and interaction pages that will be used by the multi-channel communications system 135 when processing a request to the interaction site being created by the content provider. In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by a handling system to execute the discrete programming routine to thereby perform the discrete function of the page. Examples of different pages include message pages, question pages, logic pages, transaction pages, and multimodal action pages. These different pages are described in further detail in pending application Ser. No. 14/170,722, which is incorporated herein by reference for all purposes.

An interaction page is a particular type of page that is configured to perform the function of delivering content to and/or receiving content from a user via a communications channel used by the user to contact the multi-channel system (e.g., voice communications channel for telephone contacts, chat communications channel for chat contacts, email communications channel for email contacts, and SMS communications channel for SMS contacts). A "voice page" is a particular type of interaction page that is configured to perform the function of delivering audible content to and/or receiving audible content from a user that called a telephone number assigned to the interaction site. The user is typically a caller to an IVR and the audible content is typically speech. FIGS. 4A-4H illustrate examples of one or more pages provided by a GUI of an application development tool.

The interaction sites and pages created by the content provider using the content provider interface 192 are interpreted and/or compiled by an application compiler 194 to generate scripts that are executed by the multi-channel communications system interacting with a user accessing the interaction site. In some implementations, the application compiler 194 may generate an interaction flow document, which may include XML scripts or code that correspond to pages (i.e., programming modules) of an interaction site created by the content provider. The interaction flow document may be stored in an interaction flow document database 185. The interaction flow processor 180 may access the scripts from the interaction flow document database 185 and translate them into a language that can be processed by a particular handling system when the multi-channel communications system 135 interacts with a user accessing the interaction site.

In addition to the XML scripts, the application compiler 194 may also generate other types of scripts (e.g. SCXML scripts or Java scripts) and other types of executable code using other programming languages based on pages created for the interaction site by the content provider (e.g., based on transaction pages). The other types of scripts may be used by the multi-channel communications system 135 to interact over the data network 130 with the user accessing the interaction site.

The recommendation engine 196 is operable to present a recommendation to the developer of the content provider system 142 through the content provider interface 192. That is, the recommendation engine 196 is operable to provide the user (i.e., the developer) with a recommendation for a specific artifact or custom grammars file that the recommendation engine 196 has concluded is likely of interest to the developer based either on direct searches conducted by the developer, or inferences drawn from the developer's activities on the application development platform. Additionally, the recommendation engine 196 may provide the recommendation at a time of its own choosing that is deemed most appropriate for the specific artifact. For example, the recommendation engine 196 may provide a recommended interaction page for telling jokes to be linked between two interaction pages, if the recommendation engine 196 determines that a caller may have to wait a few minutes while the system performs the processing necessary to transition between the two interaction pages.

In some implementations, the recommendation engine 196 may determine the recommendation based on the developer's profile data stored in the application builder 190. In some implementations, based on the interactions, the recommendation engine 196 may update the developer's profile data in the application builder 190.

Figure 6:
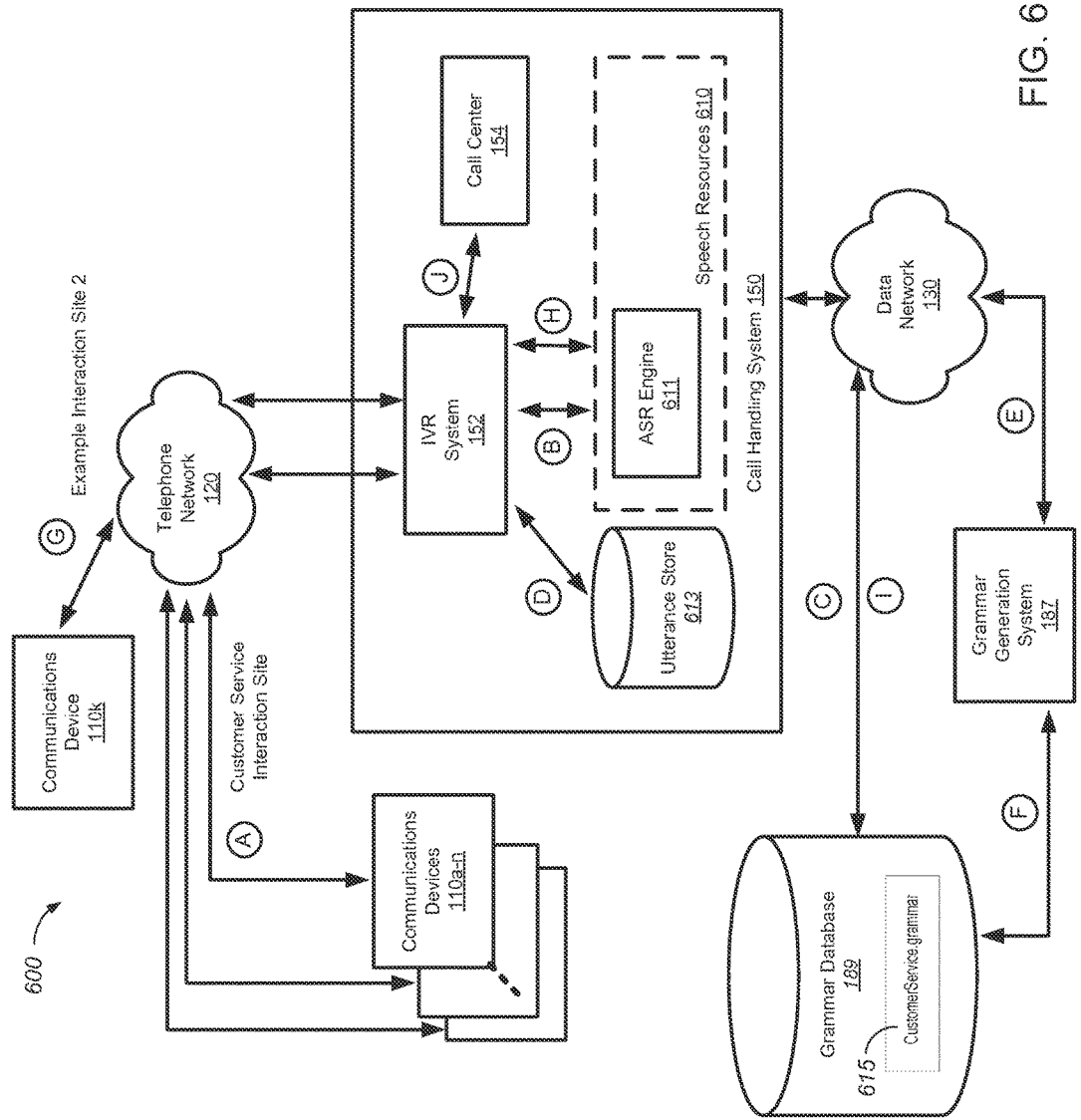
FIG. 6 is a block diagram of a communications system that utilizes shared custom grammars across multiple interaction sites.

The grammar generation system 187 is configured to generate new grammars for a custom grammars file. In some implementations, utterances that cannot be recognized by the call handling system 150 using a custom grammars file may be stored in an utterance store. The grammar generation system 187 may access the utterance store and derive new grammars based on the stored utterances. In some implementations, the grammar generation system 187 may incorporate the new grammars into the existing custom grammars file, and replace the existing custom grammars file with the updated custom grammars file in the grammar database 189. In some implementations, the grammar generation system 187 may incorporate the new grammars into the existing custom grammars file, generate a new custom grammars file, and store the new custom grammars file in the grammar database 189. In some implementations, the grammar generation system 187 may store the existing custom grammars file without incorporating the new grammars, if the developer has specified that the existing custom grammars file is not to be updated with new grammars. FIG. 6 illustrates an example of the grammar generation system 187 using and updating a custom grammars file associated with multiple interaction sites.

The grammar database 189 is configured to store grammars files including custom grammars files. In some implementations, when a call handling system 150 executes an interaction page, the interaction page may specify a grammars file as a required speech resource. The call handling system 150 may access the specified grammars file in the grammar database 189. In some implementations, multiple interaction pages or multiple interaction sites may access the grammars file simultaneously. In some other implementations, the call handling system 150 may create a local copy of the grammars file for the private access by the interaction page. In some implementations, the grammar generation system 187 may access the grammar database 189 to access, edit, add, or remove a grammars file. In some implementations, an owner or an administrator of a custom grammars file may access, edit, add, or remove the custom grammars file.

The data store 160 is configured to store user interaction data with interaction sites. In some implementations, the data store 160 may store interaction data associated with a particular user. For example, the interaction data may include the gender and other characteristics of the user, the choices made by the user during each state of the interaction, and the resources utilized during each state of the interaction. In some implementations, the data store 160 may store aggregated interaction data associated with a particular interaction site. For example, the aggregated interaction data may include data specifying a breakdown of genders among all users that accessed the particular interaction site. In some implementations, a user may opt-out such that her usage data is then not stored in the data store 160. In some implementations, a user may opt-in to have her usage data be stored in the data store 160.

The application server 140 is configured to establish a data communications session with the communications device 110 and to receive and send data to the communications device 110 across the data network 130. The application server 140 also is configured to communicate with the call handling system 150 to send data received from the communications device 110 to the IVR 152. The application server 140 also may send other application-related data that did not originate from the communications device 110 to the IVR 152 or, more generally, to the multi-channel communications system 135. The application server 140 also is configured to communicate with the data store 160 to read and/or write user interaction data (e.g., state variables for a data communications session) in a shared memory space. The application server 140 may be one or more computer systems that operate separately or in concert under the direction of one or more software programs to perform the above-noted functions. In some implementations, the application server 140 and the call handling system 150 are a single integrated computer system.

In some implementations, one or more of the handling systems in the multi-channel communications system 135 may communicatively couple with the application server 140 and the data store 160 via the data network 130. For example, the user of the communications device 110 may download an application from the application server 140, and the downloaded application may include an add-on or plug-in, that, when invoked, enables the communications device 110 to automatically communicate with the multi-channel communications system 135 to access an interaction site.

FIGS. 2A-2E illustrate a GUI 200 for an application development platform that recommends artifacts to content providers for application development. In general, each interaction site includes a flow of the interaction states that provide an overview of how users interact with the interaction site during the execution of the interaction site. A state may be configured using a page, such as, for example, a voice page or, more generally, an interaction page. It may be a tedious process if the content provider is required to configure a state in all the interaction flows that may be well known by other content providers. The content provider interface 192 of the application builder 190 provides the content provider with a unified interface to create and configure artifacts including interaction sites and interaction pages that are sharable with other content providers. With the unified interface, the user has access to a marketplace of artifacts—some of which may be publicly available for free, some may be at a cost, and some may be private (e.g., the content provider needs a special key for access to such artifacts). After the content provider downloads an artifact using the interface, the content provider is able to configure the artifact according to the content provider's specifications. The GUI 200 may be implemented by the content provider web interface 192 and presented to the content provider 142 when the content provider 142 accesses the application builder 190 using a web browser over the data network 130 to create/manage the interaction site. The following describes the different components of the GUI 200 with respect to the system 100 that is described with reference to FIG. 1. Specifically, the components of the GUI 200 are described as used by the content provider 142 to create an interaction site for providing a survey to users of a product associated with the content provider 142. However, the GUI 200 and the associated application development tool may be used by other systems, content providers or application developers to create any interaction site to perform any desired automated interaction flow in response to a customer contact.

Figure 2A:
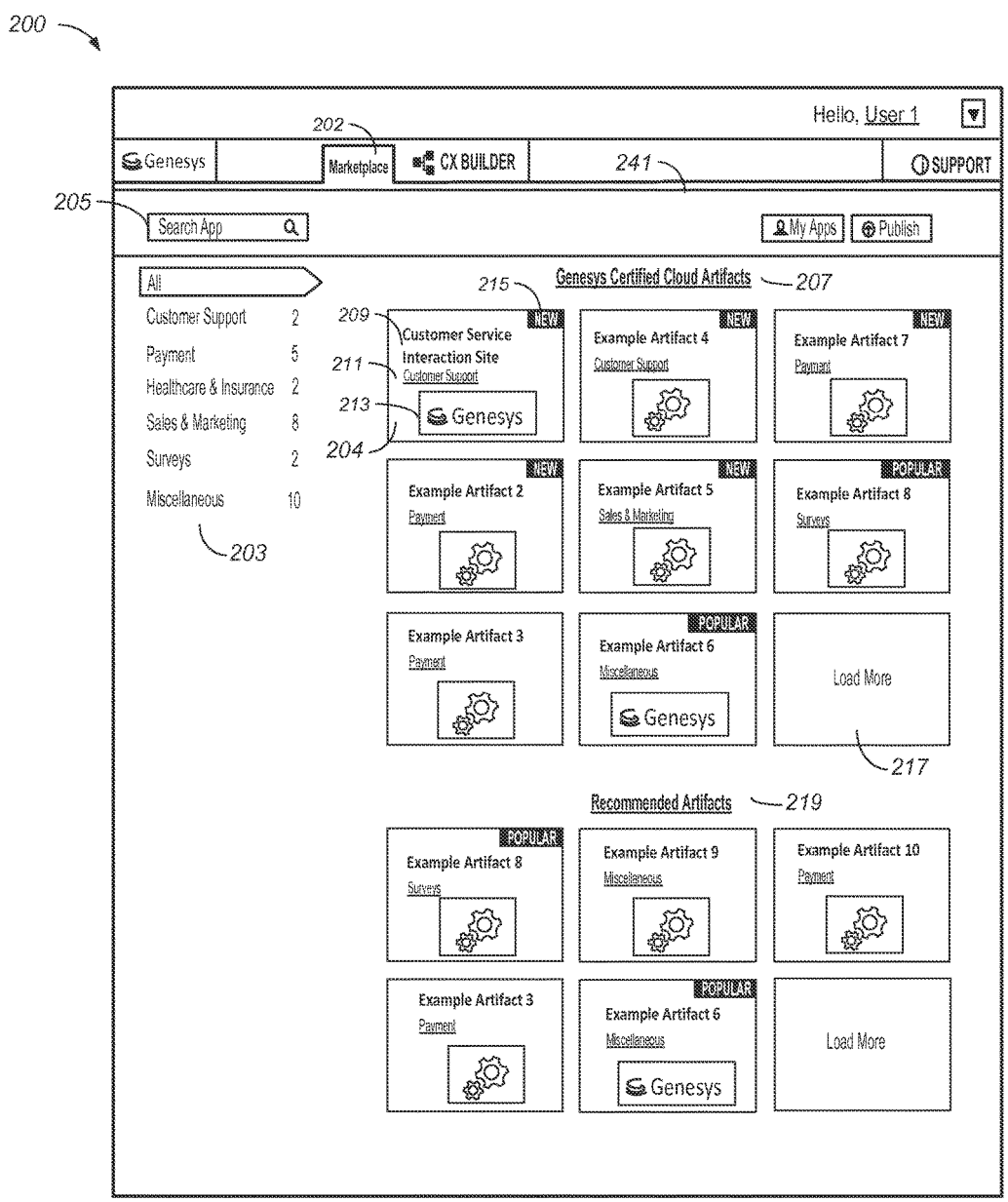

FIG. 2A illustrates a GUI 200 for an application development platform for browsing, searching, and/or viewing artifacts in a Marketplace. To view the Marketplace, the content provider may access the GUI 241 by selecting the "Marketplace" tab 202. The GUI 241 may be divided into different sections. The category section 203 identifies the number of artifacts associated with each category. In some implementations, such as, for example, the implementation described in FIG. 5, the category of an artifact is designated by the developer of the artifact. By selecting one of the listed categories in the category section 203, the content provider may filter the category of the artifacts by the selected category.

The search section 205 enables the content provider to input a search query, and the GUI 241 displays artifacts that fit the search criteria. In some implementations, the search query may include one or more search criteria that are associated with attributes of artifacts. Example attributes include the name, the release date, a review, and a category of an artifact. In some implementations, the recommendation engine 196 receives the search query and obtains a list of recommended artifacts for the content provider.

The GUI 241 may display multiple groups of artifacts to the content provider. For example, the "Genesys Certified Cloud Artifacts" section 207 may include artifacts that have been tested and certified by the service provider of the Marketplace.

As another example, the "Recommended Artifacts" 219 may include artifacts that have been selected by the recommendation engine 196 as potentially interesting to the content provider. In some implementations, the recommendation engine 196 may recommend the artifacts based on the search query submitted in the search section 205. In some implementations, the recommendation engine 196 may select the artifacts based on the content provider's answers to one or more predetermined questions presented to the content provider. For example, before the content provider enters the Marketplace, the application builder 190 may send a list of questions to the content provider. The recommendation engine 196 then determines a list of recommended artifacts based on the content provider's answer. Example questions may include:

"What is the nature of your business?"
"What is your business goal?"
"What is the daily expected call volume?"

Each displayed artifact may be visually represented by a number of attributes on the GUI 241. For example, the artifact 204 may include an icon 213, a name 209 (e.g., "Customer Service Interaction Site"), a category 211 (e.g., "Customer Support"), and/or a status 215 ("New"). An artifact may be designated as "New" if the release date of the artifact is within a threshold date. An artifact may be designated as "Popular" if the number of downloads of the artifact satisfies a threshold number.

Figure 2B:
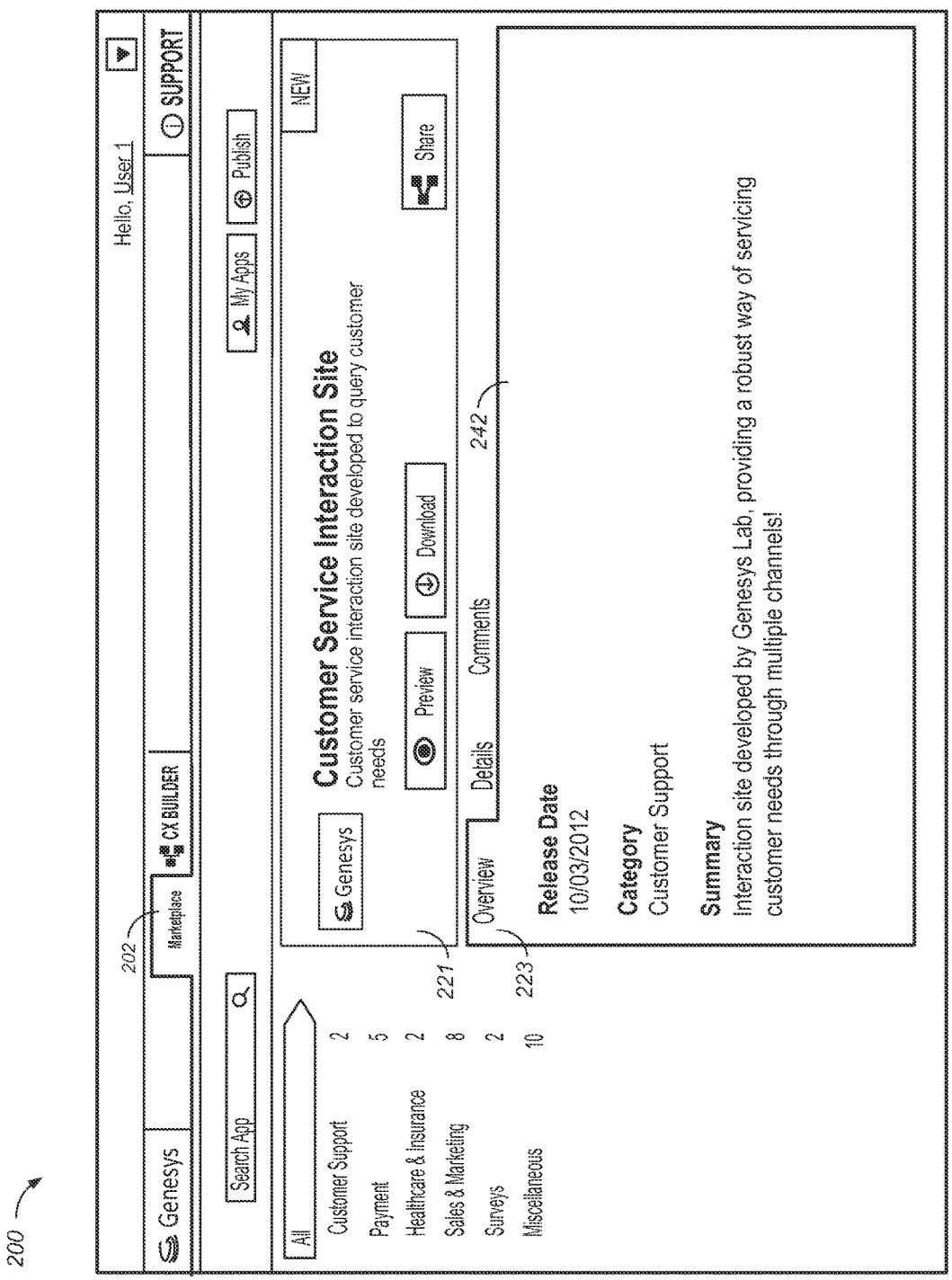

FIG. 2B illustrates a GUI 200 for an application development platform for viewing the Overview section of an artifact, after a content developer has selected the artifact. To view the Overview section of an artifact in the Marketplace, the content provider may access the GUI 242 by selecting the "Marketplace" tab 202, clicking on the artifact 204 to select the artifact and then optionally clicking on the "Overview" tab 223. The Overview section 242 may display information that allows the content provider to get a quick overview about the artifact as described by the developer of the artifact. For example, the Overview section for the Customer Experience Interaction Site displays the Release Date, the Category, and a Summary associated with the interaction site. The Overview section 242 may also display statistics about the artifacts (e.g., number of downloads, popularity trends, review, etc.). For example, the review of an artifact may be an averaged numerical value over aggregated reviews by multiple content providers. As another example, the review of an artifact may be determined by interaction data (e.g., drop-call rate, customer satisfaction, etc.) stored in the data store 160.

Figure 2C:
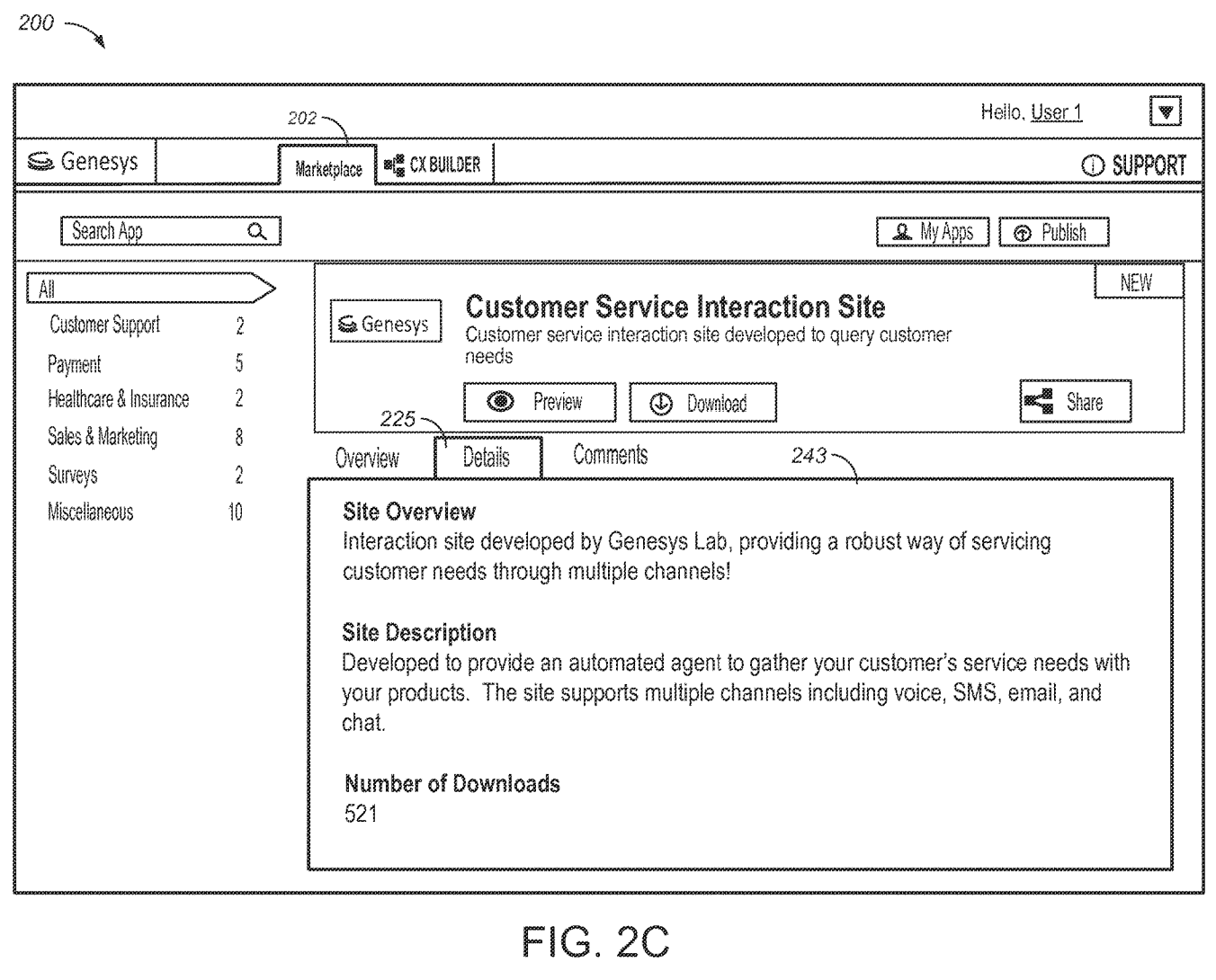

FIG. 2C illustrates a GUI 200 for an application development platform for viewing the Details section of an artifact. To view the Details section of an artifact in the Marketplace, the content provider may access the GUI 243 by selecting the "Marketplace" tab 202, clicking on the artifact 204 to select the artifact and then clicking on the "Details" tab 225. The Details section 243 may display information that allows the content provider to view detailed descriptions about the artifact as described by the developer of the artifact. The Details section 243 may also display statistics about the artifacts (e.g., number of downloads, popularity trends, review, etc.).

Figure 2D:
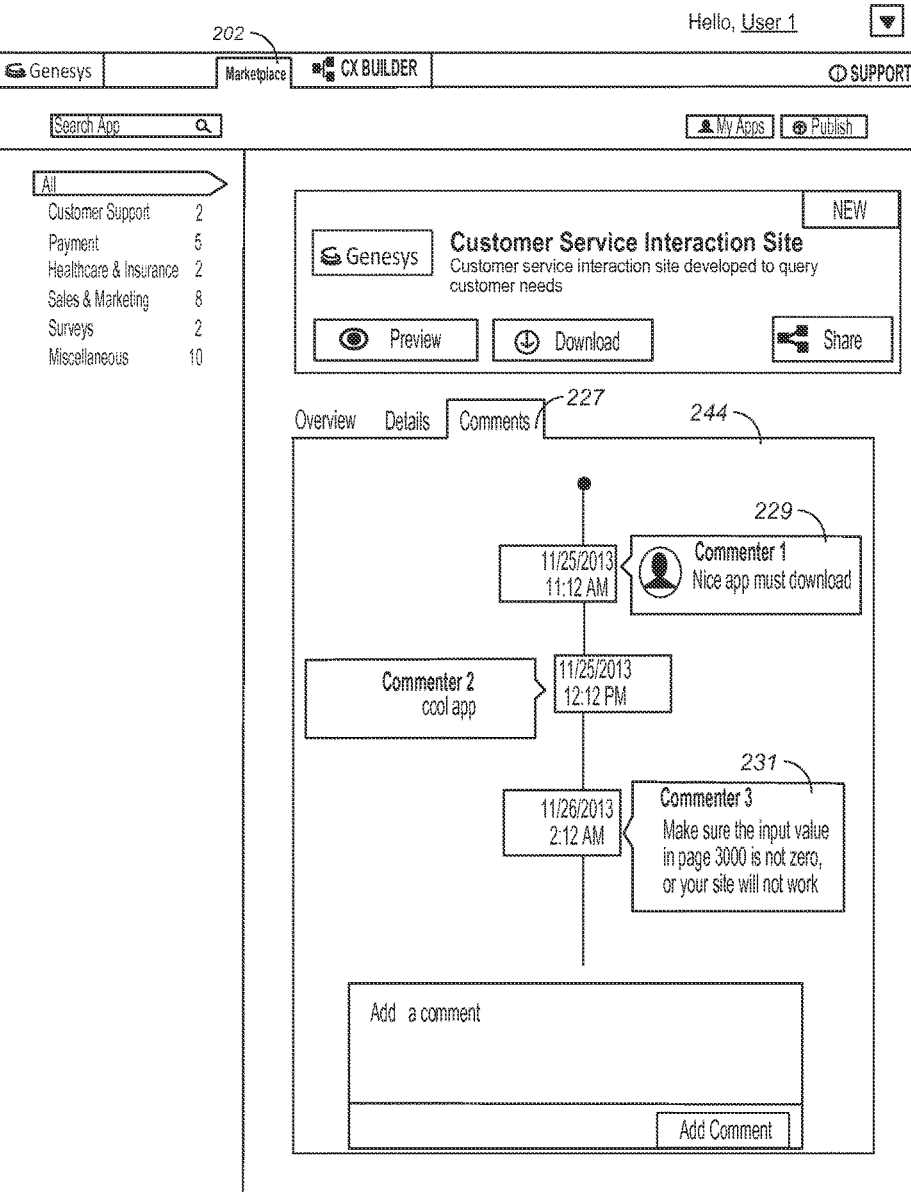

FIG. 2D illustrates a GUI 200 for an application development platform for viewing the Comments section of an artifact. To view the Comments section of an artifact in the Marketplace, the content provider may access the GUI 244 by selecting the "Marketplace" tab 202, clicking on the artifact 204 to select the artifact and then clicking on the "Comments" tab 227. The Comments section 244 allows the content provider to view comments posted by other content providers, and also allow the content provider to post comments about the artifact. For example, Commenter 1 may make a general comment 229 about the Customer Service Interaction Site, while Commenter 3 may make a technical comment 231 about the interaction site. The Comments section 244 provides any interested content provider an insight into an artifact before downloading, and also provides a place that content providers may exchange ideas on how to avoid and/or fix bugs associated with the artifacts.

Figure 2E:
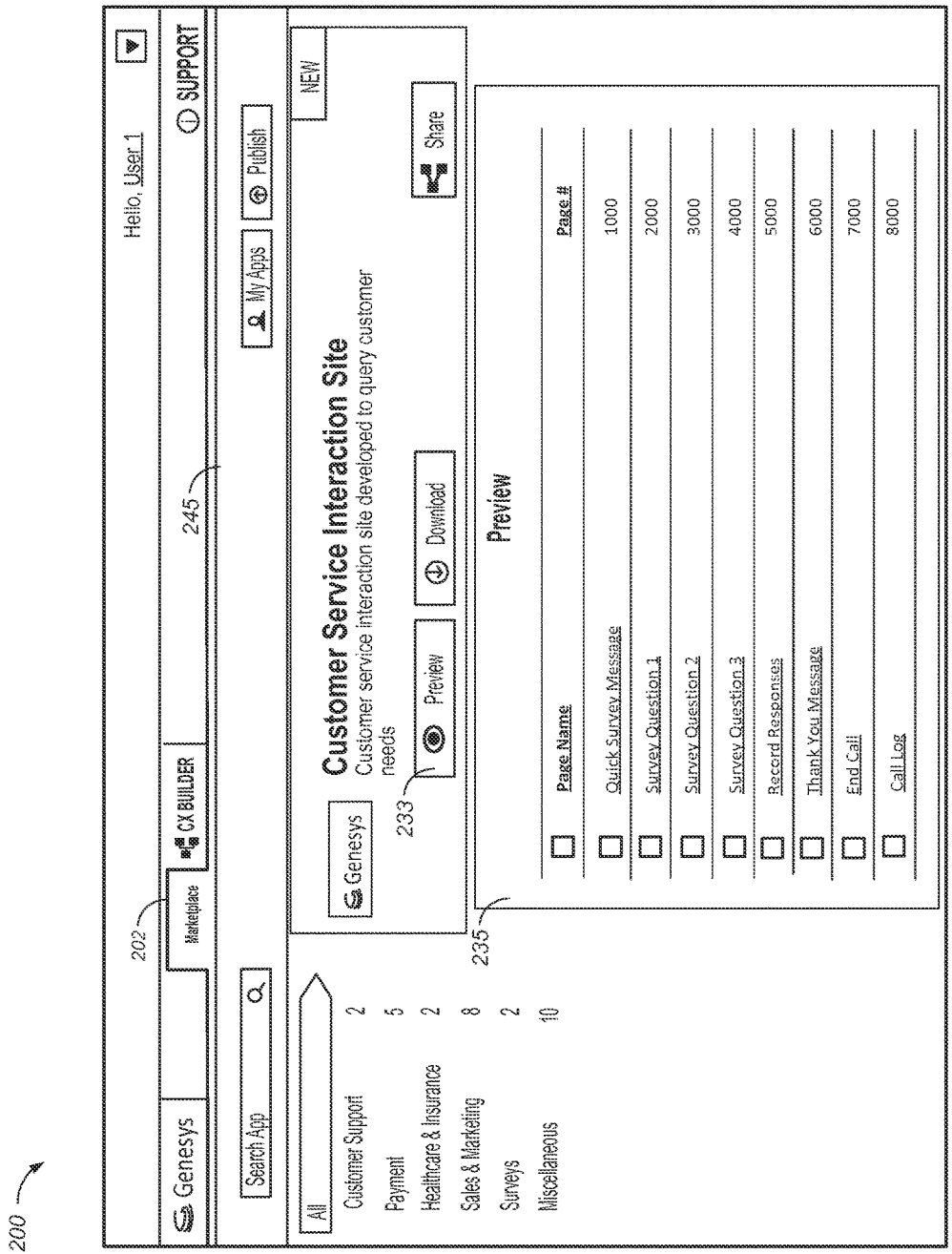

FIG. 2E illustrates a GUI 200 for an application development platform for previewing an artifact. To preview the artifact in the Marketplace, the content provider may access the GUI 245 by selecting the "Marketplace" tab 202, clicking on the artifact 204 to select the artifact and then clicking on the "Preview" button 233. The preview section 235 shows a template interaction flow of the artifact, and allows the content provider to get a more in-depth exposure to the artifact before downloading the artifact to the content provider's collection. For example, the preview section 235 here shows the interaction flow of the Customer Service Interaction Site. However, the content provider will typically not be able to see the details of each interaction page without downloading the interaction site.

The examples describe above are not limiting. A GUI for an application development platform that recommends artifacts to content providers for application development may have more or fewer configurable parameters than the GUIs described in FIGS. 2A-2E.

Figure 3:
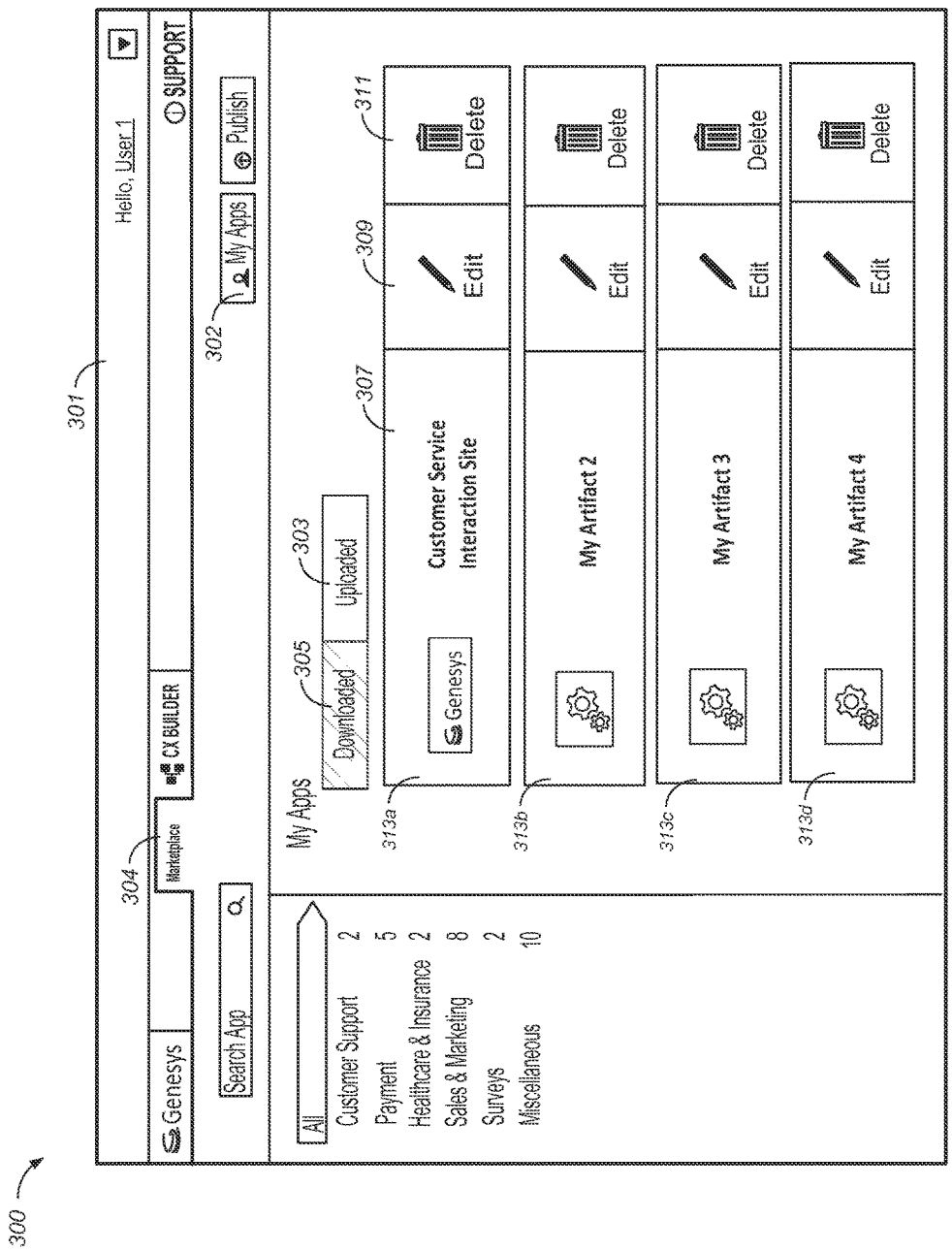
FIG. 3 illustrates a GUI for an application development platform for managing a content provider's interaction sites.

FIG. 3 illustrates a GUI 300 for an application development platform for managing a content provider's interaction sites. In general, after the content provider has successfully downloaded an artifact (e.g., an interaction site or an interaction page), the content provider may manage the artifact owned by the content provider. To view the content provider's artifacts, the content provider may access the GUI 301 by selecting the "Marketplace" tab 304, and then clicking on the "My Apps" button 302.

The "Downloaded" button 305, when selected, enables the content provider to edit and/or delete artifacts that the content provider has downloaded from the Marketplace. For example, the Customer Experience Interaction Site 313*a* and artifacts 313*b*, 313*c*, and 313*d* represent the artifacts that the content provider has downloaded from the Marketplace. The "Uploaded" button 303, when selected, enables the content provider to edit and/or delete artifacts that the content provider has uploaded to the Marketplace.

For each artifact listed, the name section 307 provides information of the artifact's name. The "Edit" section 309 enables the content provider to edit the artifact. For example, the content provider may edit an interaction site similar to that described in FIGS. 4A-4H. The "Delete" section 311 enables the content provider to remove the artifact from the content provider's artifact list.

The examples describe above are not limiting. A GUI for managing a content provider's artifact may have more or fewer configurable parameters than the GUIs described in FIG. 3.

FIGS. 4A-4H illustrate a GUI 400 for an application development platform used by a content provider to create an interaction site accessing custom grammars for a communications system. The GUI 400 may be implemented by the content provider interface 192 and presented to the content provider 142 when the content provider 142 accesses the application builder 190 using a web browser over the data network 130 to create/manage the interaction site. The following describes the different components of the GUI 400 with respect to the system 100 that is described with reference to FIG. 1. Specifically, the components of the GUI 400 are described as used by the content provider 142 to create an interaction site for providing a survey to users of a service associated with the content provider 142. However, the GUI 400 and the associated application development tool may be used by other systems, content providers or application developers to create any interaction site to perform any desired automated interaction flow in response to a customer contact.

Figure 4A:
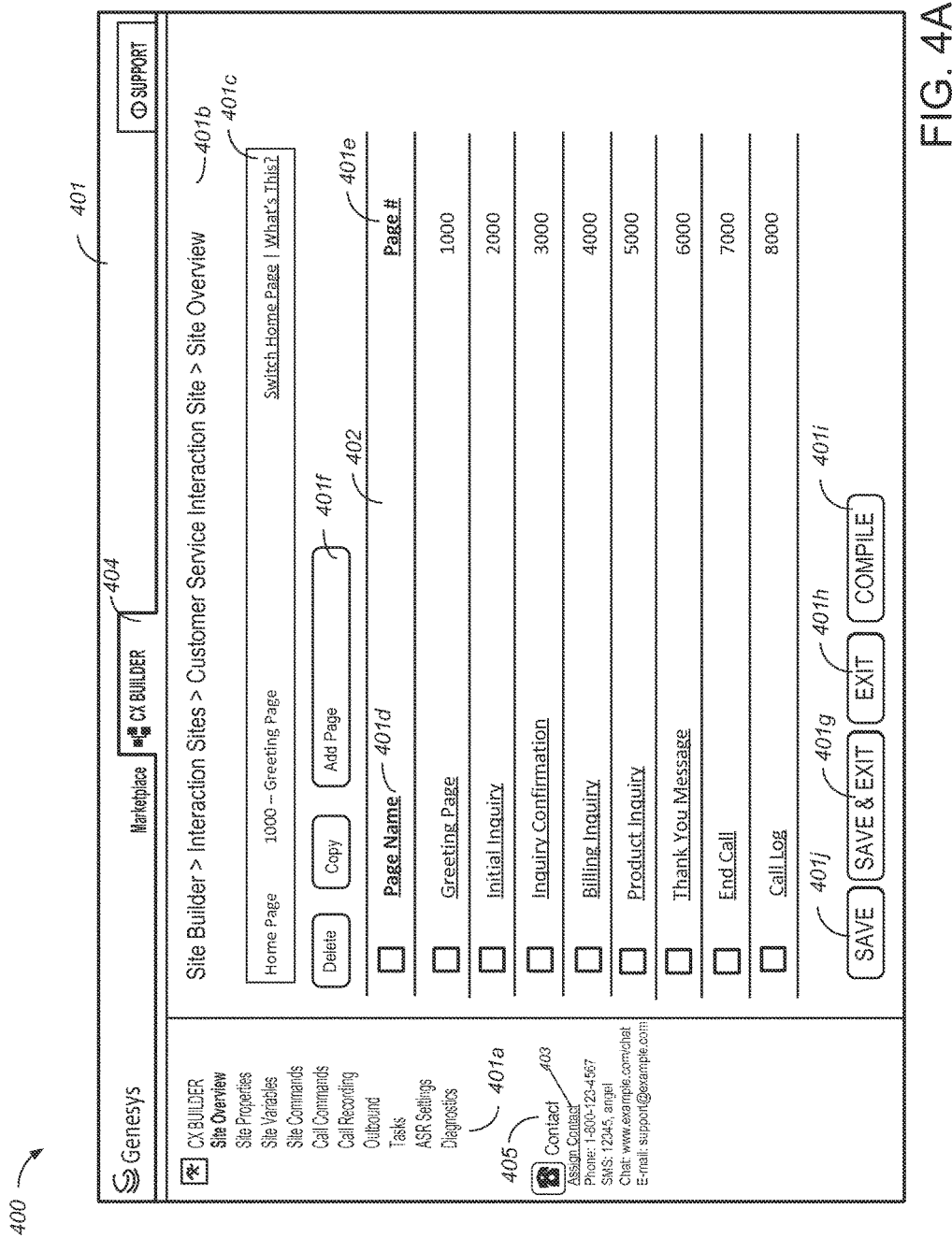

FIG. 4A illustrates an example GUI of an interaction site overview page 401 that may be presented to the content provider, for example, when the content provider clicks on the "Edit" button 309 of the "My Apps" page 301 to configure the interaction site "Customer Service Interaction Site." The CX Builder tab 404 shows that the content provider is accessing the configuration tool of the application development platform. The Site Overview page 401 may be accessed by the content provider, for example, by clicking on the "Site Overview" link 401*a*. The Site Overview page 401 provides a listing of template interaction pages associated with this template interaction site downloaded by the content provider. The name of the interaction site is specified in the heading 401b of the Site Overview page 401 (e.g., "Customer Service Interaction Site").

When the user of the communications device 110 interacts with the interaction site, the first page that is processed is identified in the "Home Page" field 401c. The content provider may specify any page that the content provider wants to be processed first as the Home Page 401c. In some implementations, the first page in the listing of pages is the same page that is listed as the "Home Page" 401c. However, in other implementations, the page that is as the "Home Page" 401c is not the first page in the listing of the pages in the Site Overview page 401.

The order in which the various pages are processed is determined by the links in the respective pages. Each page usually contains a link to the next page that is to be processed. For example, the interaction site illustrated in the Site Overview page 401 has an interaction flow 402 of eight interaction pages, including the interaction pages "Greeting Page", "Initial Inquiry", "Inquiry Confirmation", "Billing Inquiry", "Product Inquiry", "Thank You Message", "End Call", and "Call Log". Each of the pages may be identified by a page name that is shown in the Page Name field 401d. In addition or as an alternative to the page name, each page also may be identified by a page number that is shown in the Page # field 401e. The page name and page number of a page are specified by the content provider when creating the pages for the interaction site. A page may have a unique page name, or it may have a page name that is similar to the page name of another page. In case two or more pages share the same page name, they may be differentiated based on the page numbers. The combination of page name and page number uniquely identifies a page. A user may access and modify any of the pages displayed in the interaction flow 402 by selecting them from the displayed list.

Importantly, a second page that is processed after the processing of a first page may be said to be directly linked to that first page if the first page includes a direct link to the second page without any intervening pages therebetween. Alternatively, a second page may instead be said to be indirectly linked to the first page if that first page is linked to the second page in the interaction flow with one or more pages being processed between the processing of the first page and the processing of the second page.

In other implementations, the Site Overview page 401 may additionally or alternatively present the pages in a two dimensional or three dimensional display that visually depicts the links between the pages. For example, each page may be displayed as a page graphical element, such as, for example, a rectangle or a block, with one or more link graphical elements, such as, for example, lines, connecting the page graphical elements to other page graphical elements to which they are linked. Text may be overlaid on or displayed in proximity to the page and/or line graphical elements to communicate the identity of the corresponding page and/or the nature of the link between the elements.

The content provider may create a new page by clicking the "Add Page" button icon 401f. When the "Add Page" button icon 401f is clicked, a new page is added to the interaction flow 402. In response to selecting the button icon 401f, the GUI 400 may present a set of page templates for selection in, for example, a drop-down list. The page templates may include, for example, message pages, question pages, logic pages, transaction pages, and multimodal action pages. The user may select a page template from the list to generate a page of the corresponding type using the template. The template presents to the user the necessary fields and/or controls for that page type and the user may populate the fields (e.g., by typing text into the fields) and/or select the controls to generate a page of the corresponding type.

Alternatively, a new page may be created by copying a previously created page. The content provider may select the page to be copied by checking the checkbox to the left of the page to be copied and then selecting the "Copy" button. An existing page can be deleted by checking the checkbox to the left of the page, and then clicking the "Delete" button. The content provider may save the interaction site by clicking the "Save" button 401j. The content provider may save the interaction site and then exit the GUI 401 by clicking the "Save & Exit" button 401g. The content provider may exit the GUI 401 without saving the interaction site by clicking the "Exit" button 401h. The content provider may compile the interaction site by clicking the "Compile" button 401i, where the application compiler 194 may compile the input parameters into an interaction flow document, and may save the interaction flow document in the interaction flow document database 185.

The Contact section 405 lists the contact information associated with each of the multiple channels for the interaction site "Customer Service Interaction Site". For example, a user may access the interaction site via a voice channel by calling the number "1-800-123-4567." Alternatively, the user may access the interaction site via a SMS channel by sending a text message with the short code "12345" and the keyword "angel." Alternatively, the user may access the interaction site via a Chat channel by accessing the URL "www.example.com/chat." Alternatively, the user may access the interaction site via an E-mail channel by sending an e-mail to the address "support@example.com." The "Assign Contact" link 403 allows the content provider to define the contact information for an interaction site.

Figure 4B:
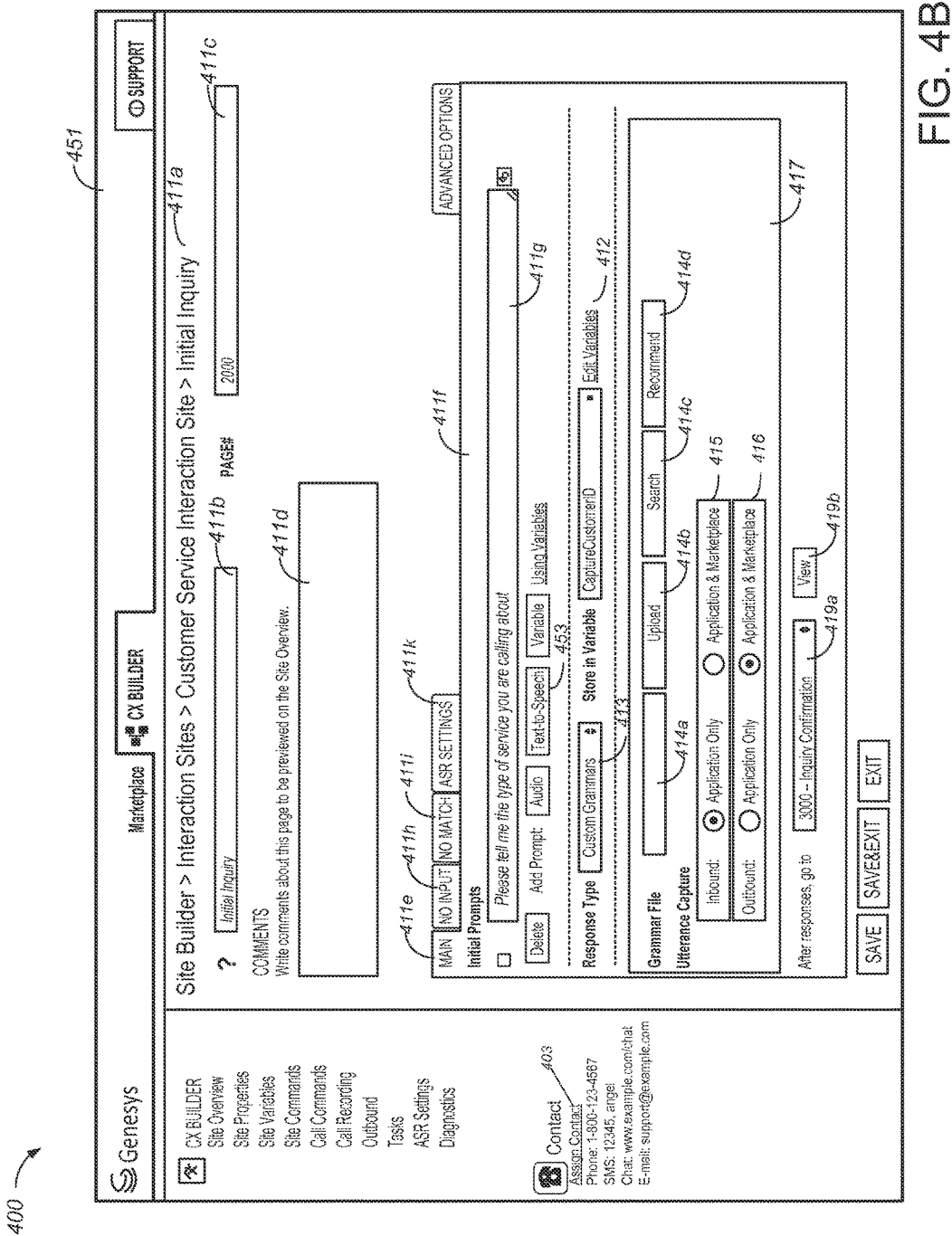

FIG. 4B illustrates an example GUI 451 for configuring an interaction page (specifically, a message page) that is the second page that is processed for the interaction site in the event that the user accesses the interaction site. Note that this interaction page is a template interaction page, and may include one or more default parameters for the content provider to input values. In addition, this template interaction page may also include one or more default values that correspond to the one or more default parameters, where the content provider may edit the values accordingly. The "Initial Inquiry" interaction page is identified by its page name 411b and/or page number 411c. The page name 411b and the page number 411c correspond to the name of the page shown in the Page Name field 401d and the number of the page shown in the Page # field 401e respectively, shown in the Site Overview page 401.

The comments text box 411d allows the content provider to enter comments about the interaction page to be previewed on the Site Overview page 401. The main tab 411e of the interaction page allows the content provider to enter parameters that configure the interaction page for the IVR channel. The "Response Type" parameter 413 allows the content provider to specify what type of response the multi-channel communications system 135 may expect the user to provide after the message specified in the "Initial Prompts" parameter 411g is delivered to the user, which allows the content provider to customize the resources to be used to process the received response. Here, the initial prompt expects an answer that specifies a custom type of service provided by the content provider, and the content provider sets the "Response Type" parameter 413 is set to "Custom Grammars" accordingly. In some implementations, the received information may be stored in a variable "CaptureCustomerID" as specified by default in the "Store in Variable" drop-down menu 412, where the variable may be selected from a list of variables previously specified by the content provider. The variable stores the utterance provided by the user and processed by the multi-channel communications system 135. In some implementations, the value of the variable may be stored in the data store 160.

The section 417 displays elements that are associated with custom grammars. The content provider system 142 may display section 417 to the content provider after the content provider sets the "Response Type" parameter 413 to "Custom Grammars." The field 414a corresponds to the name of a custom grammars file that the content provider may specify to process the response captured by the call handling system 150 from the communications device 110. In some implementations, a default custom grammars file name may be displayed in the field 414a. In some implementations, the content provider may specify the custom grammars file by clicking on the "Upload" button 414b. For example, after the content provider clicks on "Upload" button 414b, the content provider system 142 may show a new GUI (not shown) to the content provider or overlay the new GUI on top of the GUI 451 displaying the directories and files that the content provider has accessed to. The content provider may then select a predefined custom grammars file to be used for this interaction page. After the selection, the name of the predefined custom grammars file may appear in field 414a.

Figure 4C:
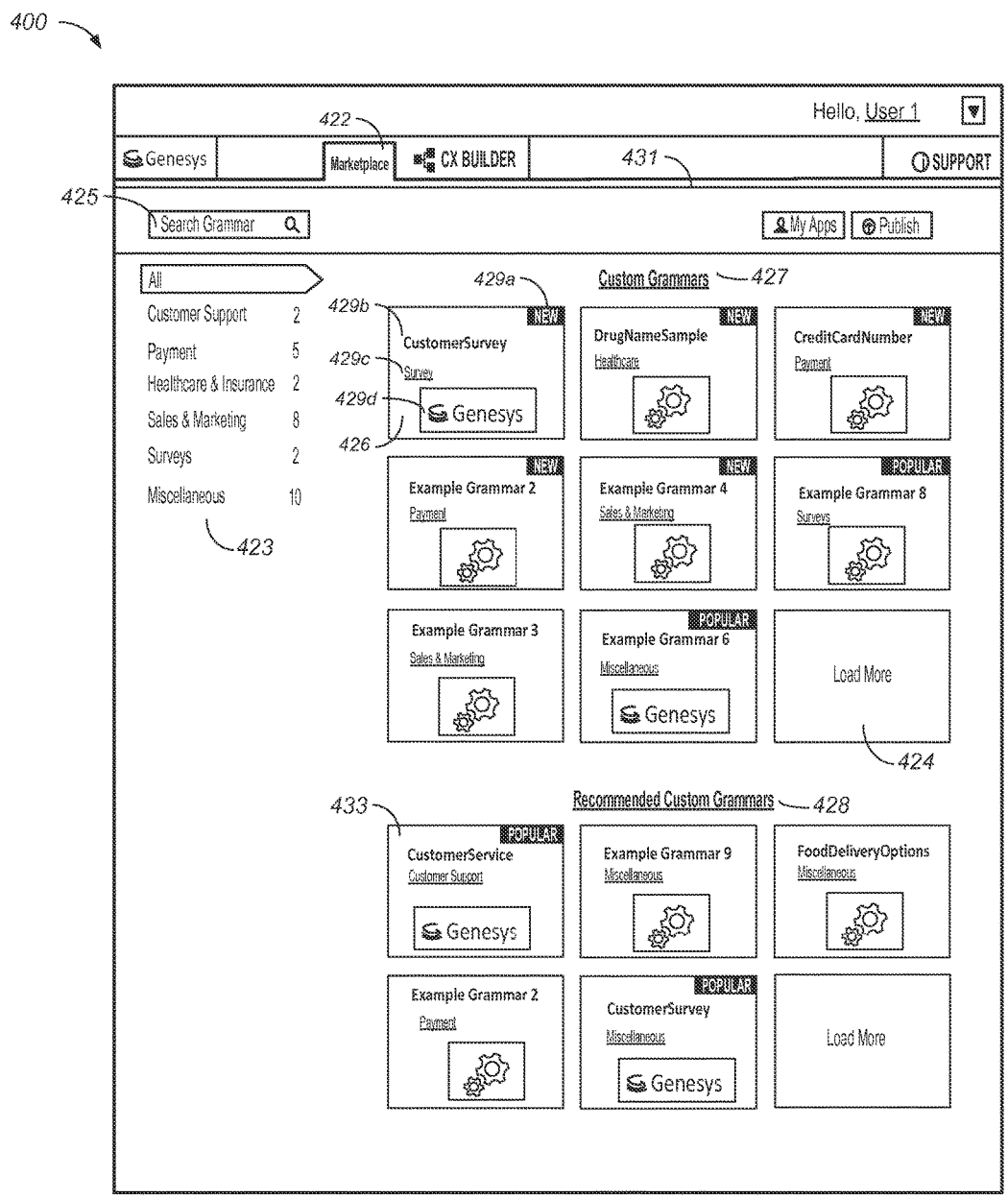
Figure 4E:
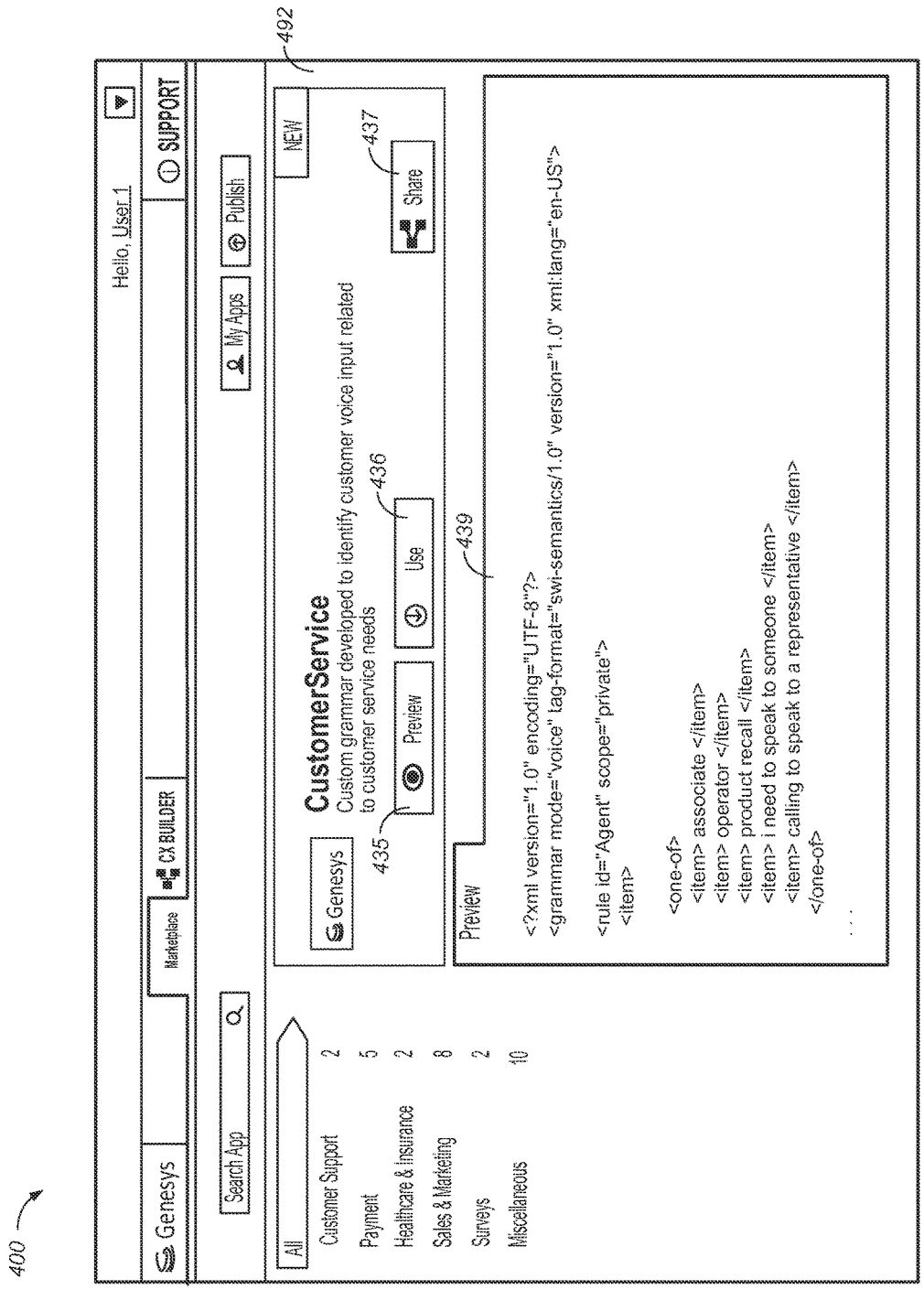

As described in FIGS. 4C-4E, in some implementations, the content provider may search for a custom grammars file in the Marketplace by clicking on the "Search" button 414c. As described in FIG. 4G, in some implementations, the content provider may ask for the recommendation engine 196 to provide a list of custom grammars files that may be relevant to the interaction page by clicking on the "Recommend" button 414d.

In some implementations, the content provider system 142 may display the "Inbound" section 415 and the "Outbound" section 416 to the content provider. The "Inbound" 415 and the "Outbound" 416 sections enable the content provider to configure the sharing of the custom grammars file with other content providers using the Marketplace. The "Inbound" 415 section enables the content provider to configure whether to update the selected custom grammars file with new custom grammars generated by the grammar generation system 187 using user utterances collected by other interaction sites developed by other content providers. For example, if the content provider selects the "Application Only" radio button in the "Inbound" section 415, once the interaction site is compiled, the custom grammars file associated with this interaction page will not be updated with new custom grammars generated by the grammar generation system 187 using user utterances collected by other interaction sites developed by other content providers. This option may be implemented, for example, by creating a private custom grammars file stored in the grammar database 189, where the private custom grammars file may not be updated with new custom grammars generated by other interaction sites. In some implementations, the custom grammars file associated with this interaction page may still be updated with new custom grammars generated by the grammar generation system 187 using user utterances collected by the interaction site developed by the content provider. As another example, if the content provider selects the "Application & Marketplace" radio button in the "Inbound" section 415, once the interaction site is compiled, the custom grammars file associated with this interaction page will be updated with new custom grammars generated by the grammar generation system 187 using user utterances collected by other interaction sites developed by other content providers. This option enables the content provider to leverage data collected by other content providers to improve the capability of the custom grammars file over time. This option may be implemented, for example, by accessing a shared custom grammars file stored in the grammar database 189, where the shared custom grammars file may be updated with new custom grammars generated by other interaction sites over time.

The "Outbound" section 416 enables the content provider to configure whether to share new custom grammars generated by the grammar generation system 187 using user utterances collected by this interaction sites with other interaction sites developed by other content providers that also use the custom grammars file. For example, if the content provider selects the "Application Only" radio button inside the "Outbound" section 416, once the interaction site is compiled, new custom grammars may be generated over time by the grammar generation system 187 using user utterances collected by this interaction site. However, the new custom grammars will not be shared with other interaction sites developed by other content providers. This option may be implemented, for example, by creating a private custom grammars file stored in the grammar database 189, where the private custom grammars file may not be accessed by other interaction sites. As another example, if the content provider selects the "Application & Marketplace" radio button inside the "Outbound" section 416, once the interaction site is compiled, the custom grammars file associated with this interaction page will be updated with new custom grammars generated by the grammar generation system 187 using user utterances collected by this interaction site developed by the content provider. This option enables the content provider to share data collected by the content provider, such that other content providers may enjoy an improvement of the capability of the custom grammars file over time.

The pull-down menu 419a allows the content provider to specify the next destination interaction page after the complete execution of this interaction page. The content provider may select any page listed in the interaction flow 402 from the pull-down menu 419a. The "View" button 419b allows the content provider to view a GUI on the content provider system 142 similar to the GUI 451 for configuring the interaction page as specified in the destination interaction page pull-down menu 419a.

FIG. 4C shows an example GUI 431 that may be displayed on the content provider system 142 in response to the content provider clicking on the "Search" button 414c for browsing, searching, and/or viewing custom grammars files in a Marketplace 422. The GUI 431 may be divided into different sections. The category section 423 identifies the number of custom grammars files associated with each category. By selecting one of the listed categories in the category section 423, the content provider may filter the category of the custom grammars files by the selected category.

The search section 425 enables the content provider to input a search query, and the GUI 431 displays custom grammars files that fit the search criteria. In some implementations, the search query may include one or more search criteria that are associated with attributes of custom grammars files. Example attributes include the name, the release date, the name of the developer, a description, a review, the number of sharing, and/or a category of a custom grammars file. In some implementations, the recommendation engine 196 receives the search query and obtains a list of recommended custom grammars file for the content provider.

The GUI 431 may display multiple groups of custom grammars files to the content provider. For example, the "Custom Grammars" section 427 may include custom grammars files satisfying the search criteria in the Marketplace.

As another example, the "Recommended Custom Grammars" 428 may include custom grammars files that have been selected by the recommendation engine 196 as potentially interesting to the content provider. In some implementations, the recommendation engine 196 may recommend the custom grammars files based on the search query submitted in the search section 425. In some implementations, the recommendation engine 196 may select the custom grammars files based on the content provider's answers to one or more predetermined questions presented to the content provider, as described in FIG. 2A. In some implementations, the recommendation engine 196 may select the custom grammars files based on one or more attributes associated with the interaction page that is being configured, as described in FIG. 4G.

Each displayed custom grammars file may be visually represented by a number of attributes on the GUI 431. For example, the custom grammars file 426 may include an icon 429d, a name 429b (e.g., "Customer Survey"), a category 429c (e.g., "Survey"), and/or a status 429a ("New"). A custom grammars file may be designated as "New" if the release date of the custom grammars file is within a threshold date. An custom grammars file may be designated as "Popular" if the number of sharing of the custom grammars file satisfies a threshold number.

FIG. 4D illustrates a GUI 400 for an application development platform for viewing the Overview section of a custom grammars file, after a content developer has selected the custom grammars file. To view the Overview section 438 of a custom grammars file in the Marketplace, the content provider may access the GUI 491 by clicking on the custom grammars file 433 as shown in FIG. 4C to select the custom grammars file. The Overview section 438 may display information that allows the content provider to get a quick overview about the custom grammars file as described by the developer of the custom grammars file. For example, the Overview section for the Customer Service custom grammars file displays the Release Date, the Category, a Summary associated with the interaction site, and the Number of interaction sites that currently share the custom grammars file. The Overview section 438 may also display statistics about the custom grammars file (e.g., number of downloads, popularity trends, review, etc.). For example, the review of a custom grammars file may be an averaged numerical value over aggregated reviews by multiple content providers. As another example, the review of a custom grammars file may be determined by interaction data (e.g., drop-call rate, customer satisfaction, etc.) stored in the data store 160.

FIG. 4E illustrates a GUI 400 for an application development platform for previewing a custom grammars file. To preview the custom grammars file in the Marketplace, the content provider may access the GUI 492 by clicking on the artifact 433 to select the custom grammars file and then clicking on the "Preview" button 435. The preview section 439 shows a template GRXML code of the custom grammars file, and allows the content provider to get a more in-depth exposure to the custom grammars file before applying the custom grammars file to the interaction page. For example, the preview section 439 here shows various custom grammars the custom grammars file includes for forwarding the caller to a live agent. If the content provider wishes to apply this custom grammars file to the interaction page, the content provider may click on the "Use" button 436. If the content provider wishes to share information about this custom grammars file with another person, the content provider may click on the "Share" button 437.

Figure 4F:
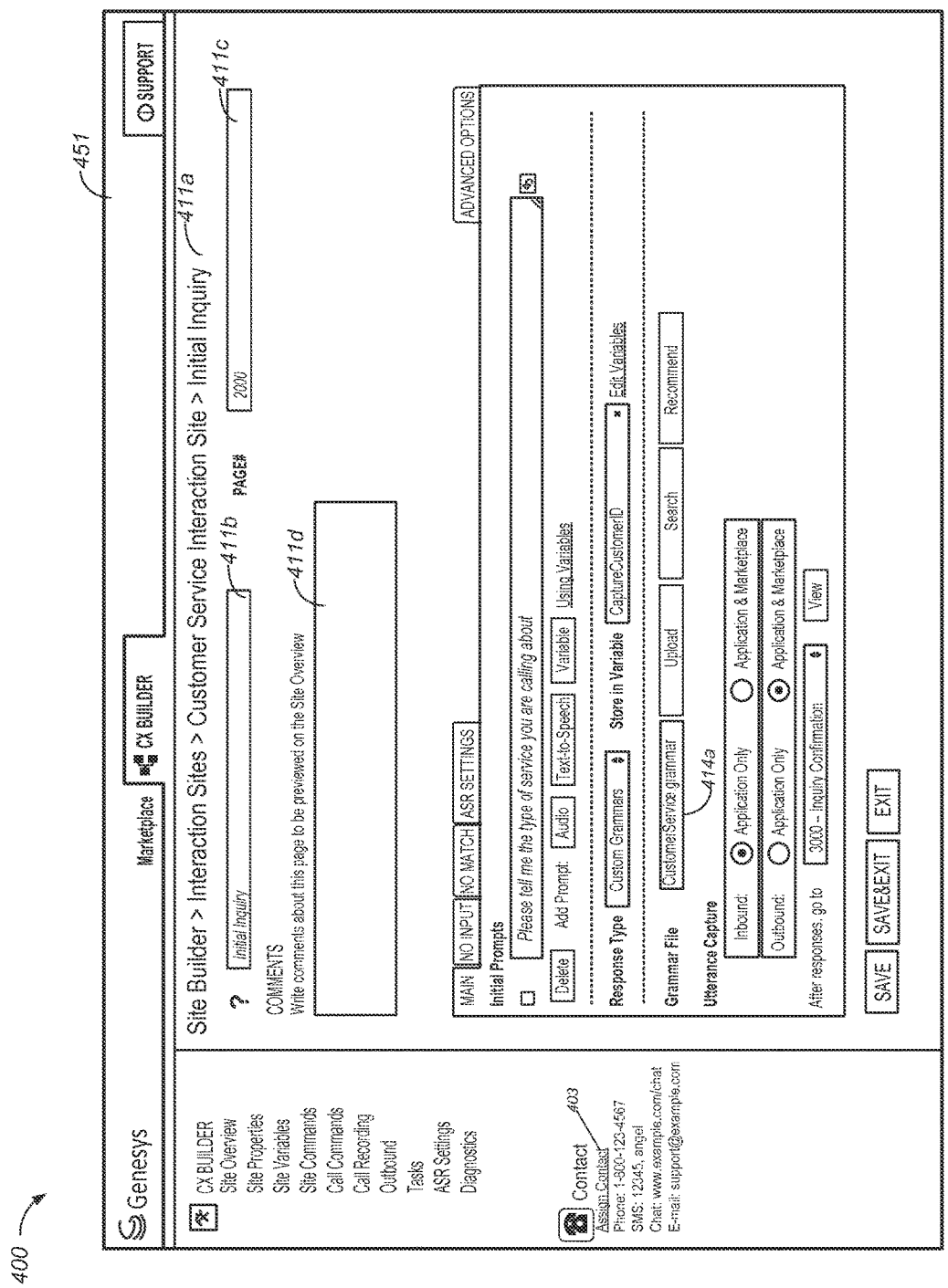

FIG. 4F illustrates the example GUI 451 showing that in response to the content provider clicking on the "Use" button 436 in the Marketplace, the value in the field 414a is updated to show "CustomerService.grammar" as the custom grammars file associated with the interaction page "Initial Inquiry."

Figure 4G:
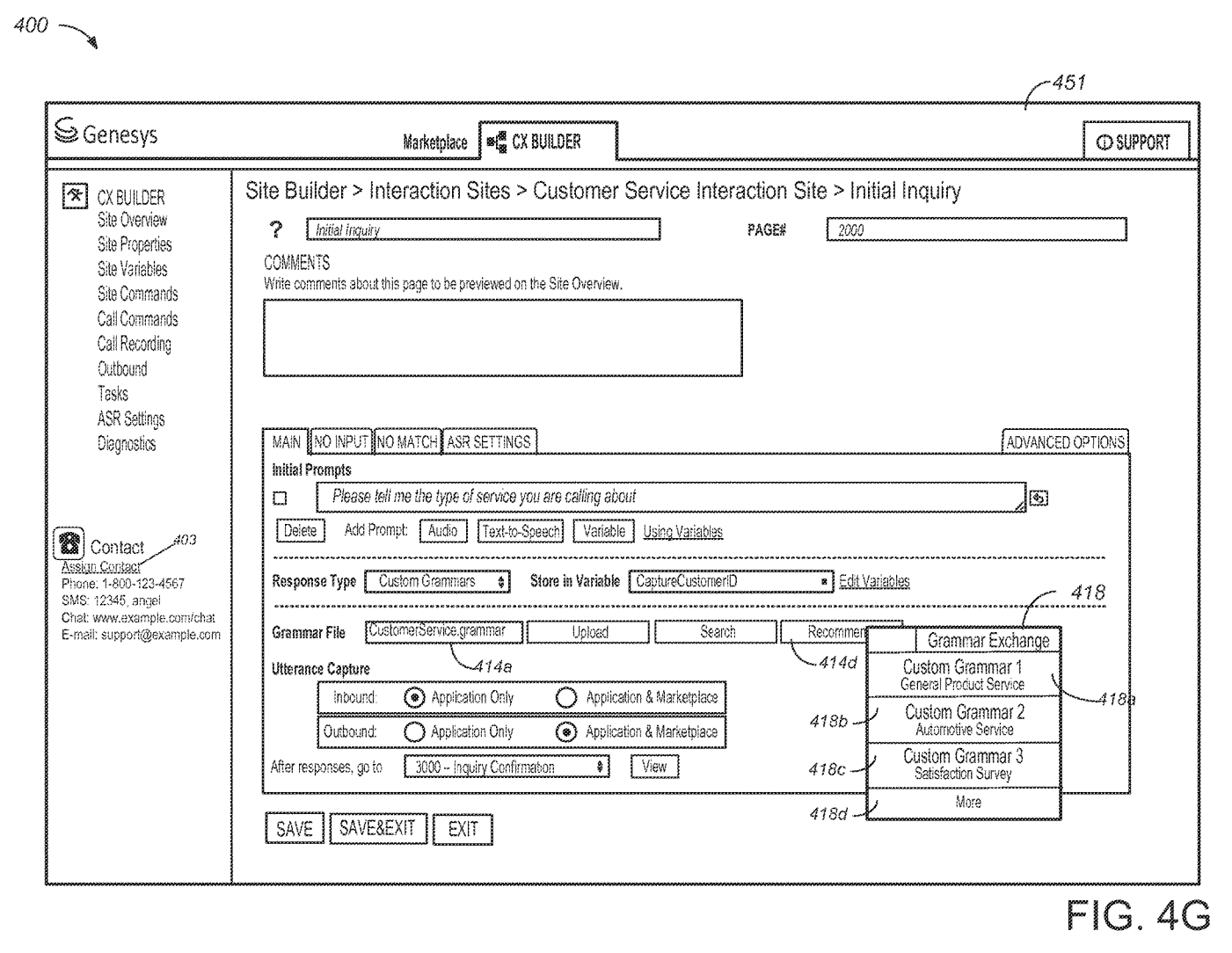

FIG. 4G shows an example GUI 451 that may be displayed on the content provider system 142 in response to the content provider clicking on the "Recommend" button 414d. In response to the content provider clicking on the "Recommend" button 414d, the content provider system 142 displays a list of recommended custom grammars files 418. In some implementations, the list of recommended custom grammars files 418 may be obtained by the recommendation engine 196 based on one or more values corresponding to one or more parameters associated with the interaction page that is being configured. For example, for the interaction page "Initial Query," the parameter "Initial Prompts" has a value of "Please tell me the type of service you are calling about." Based on these values, the recommendation engine 196 may generate a search query and obtain a list of recommended custom grammars files 418 to be displayed on the GUI 451 based on the search results.

In some implementations, the list of recommended custom grammars files 418 may be obtained by the recommendation engine 196 based on one or more values corresponding to one or more parameters associated with the profile of the content provider. For example, if the content provider has specified that it is in the computer hardware business, the recommendation engine 196 may provide a list of recommended custom grammars files that other content providers in the same business have shared for the context of "Initial Inquiry."

In some implementation, the number of recommended custom grammars files presented on the GUI 451 may be fewer than the number recommended custom grammars files obtained by the recommendation engine 196. The content provider interface 192 may determine the number of recommended interaction pages presented on the GUI 451 based on a number of factors. For example, the number of recommended interaction pages presented on the GUI 451 may be based on the size of the display on the content provider system 142. Here, the list of recommended interaction pages 418 includes three recommended custom grammars files 418a, 418b, and 418c. For each recommended custom grammars files, a custom grammars file name (e.g., "Custom Grammar 1") is presented as well as a brief description (e.g., "General Product Service"). The content provider may select any one of the three recommended custom grammars files 418a, 418b, and 418c to replace the value in the field 419a. Alternatively, the content provider may click on the "More" button 418d, which will display more recommended custom grammars files to the content provider. Although not shown here, in some implementations, the content provider may be offered to preview the custom grammars files before selecting a custom grammars file. In some implementations, the list 418 may include a search textbox that enables the content provider to enter a search query to filter and/or find additional recommended interaction pages.

The examples describe above are not limiting. A GUI for developing an interaction page used in a multi-channel communications environment may have more or fewer configurable parameters than the GUIs described in FIGS. 4A-4G.

The content provider may compile the updated interaction site by clicking the "Compile" button 401i as shown in FIG. 4A, where the application compiler 194 may compile the input parameters into an interaction flow document, and may save the interaction flow document in the interaction flow document database 185.

While the pages shown in FIGS. 4A-4G are all messages pages, other page types of the interaction site may similarly be used to configure parameters for multiple different communications channels. For example, question pages and multimodal action pages may present configurable parameters that include common parameters generic to all communications channels and, in some implementations, may additionally include channel-specific parameters. In some implementations, some page types, such as, for example, logic pages and transaction pages, are always generic to all communication channels. In other implementations, logic pages and transaction pages include configurable parameters that are generic to all communications channels and also include configurable parameters that are channel-specific.

Figure 5:
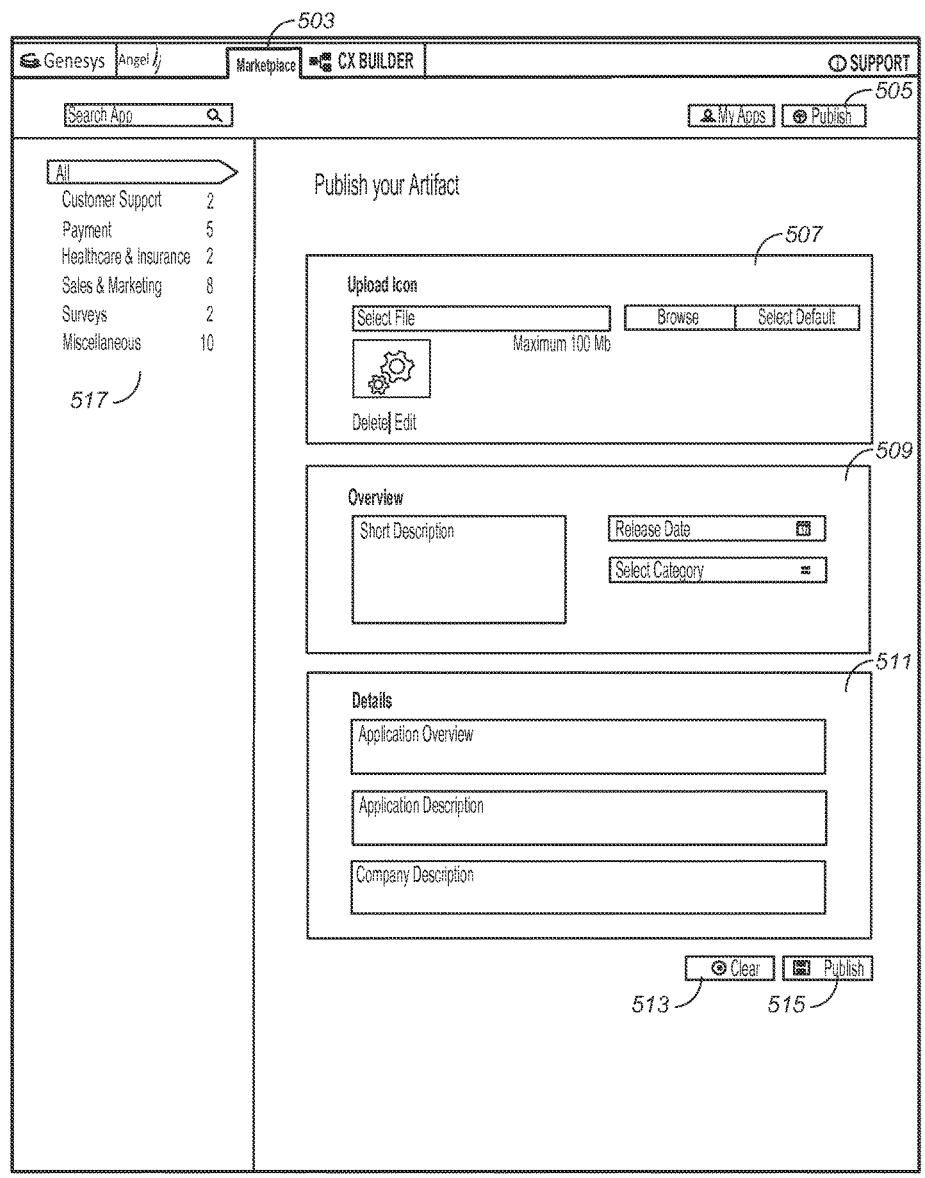
FIG. 5 illustrates a GUI for an application development platform that is used by a content provider to publish an artifact to the application development platform.

FIG. 5 illustrates a GUI 500 for an application development platform that is used by a content provider to publish an artifact to the application development platform. In general, after the content provider has successfully designed an artifact (e.g., an interaction site or an interaction page), the content provider may share the artifact with the other content providers. or developers. To publish an artifact, the content provider may access the GUI 500 by selecting the "Marketplace" tab 503, and then clicking on the "Publish" button 505.

The "Upload Icon" section 507 enables the content provider to browse, add, and/or delete an image associated with the artifact. For example, the content provider may add an icon associated with the artifact. When published in the marketplace, other content providers may view the artifact similar to that described in FIG. 2A.

The "Overview" section 509 enables the content provider to add overview information about the artifact. For example, the content provider may add information related to a brief description, a release date, and/or a category similar to the list 517 of categories. When published in the marketplace, other content providers may view the artifact similar to that described in FIG. 2B.

The "Details" section 511 enables the content provider to add detailed information about the artifact. For example, the content provider may add information related to a site overview, a site description, and/or a company description associated with the artifact. When published in the marketplace, other content providers may view the artifact similar to that described in FIG. 2C.

The "Clear" button 513 enables the content provider to clear the entered content in sections 507, 509, and 511. The "Publish" button 515 enables the content provider to publish the artifact in the marketplace for others to browse, search, and download.

The examples describe above are not limiting. A GUI for uploading an artifact used in a multi-channel communications environment may have more or fewer configurable parameters than the GUIs described in FIG. 5.

FIG. 6 is a block diagram of an example communications system 600 that utilizes shared custom grammars across multiple interaction sites. Referring back to descriptions in FIG. 1, the communications system 600 illustrates an example implementation of a system that supports sharing of custom grammars files. In general, the communications system 600 includes multiple communications devices 110a-n and 110k, the telephone network 120, the data network 130, the call handling system 150, the grammar generation system 187, and the grammar database 189. The call handling system 150 includes an IVR system 152, an utterance store 613, and speech resources 610 including an ASR (automatic speech recognition) engine 611.

FIG. 6 also illustrates an example flow of data, shown in states (A) to (J). States (A) to (J) may occur in the illustrated sequence, or they may occur in a sequence that is different from the illustrated sequence.

In this example, an interaction site "Customer Service Interaction Site" developed using the application development platform by one content provider and another interaction site "Example Interaction Site 2" developed using the application development platform by another content provider are configured to share a common custom grammars file 615, "CustomerService.grammar."

During state (A), the communications device 110a communicates with the call handling system 150 to access the interaction site "Customer Service Interaction Site." For example, a user of the communications device 110a may dial a telephone number associated with the Customer Service Interaction Site, and the telephone network 120 routes the communications device 110a to the call handling system 150. The call handling system 150 may open a communications port between the communications device 110a and the IVR system 152, and the IVR system 152 may execute the interaction flow associated with the Customer Service Interaction Site to establish a communications session with the communications device 110a.

During state (B), the IVR system 152 executes a step of the interaction flow associated with the Customer Service Interaction Site, and solicits voice input from the user of the communications device 110a. For example, the IVR system 152 may execute the interaction page "Initial Inquiry" as described in FIG. 4B, where an initial voice prompt asks the user of the communications device 110a: "Please tell me the type of service you are calling about." The user may respond by speaking an utterance through a microphone of the communications device 110a: "I am not happy with my purchase, and would like to talk to somebody." The IVR system 152 receives the utterance, and may use one or more speech resources 610 to process the user's utterance. For example, the IVR system may use the ASR engine 611 to transcribe the utterance.

During state (C), the IVR system 152 accesses the custom grammars file to try to identify the service that the user would like to receive. For example, the IVR system 152 accesses the "CustomerService.grammar" custom grammars file 615 stored in the grammar database 189. In some implementations, the IVR system 152 may access the custom grammars file 615 after executing the interaction page but before receiving the user's utterance. In some other implementations, the IVR system 152 may access the custom grammars file 615 after receiving the user's utterance. In some implementations, the IVR system 152 may store a local copy of the custom grammars file 615 in the call handling system 150. In some other implementations, the IVR system 152 may dynamically access the custom grammars file 615 in the grammar database 189 when the interaction site or the interaction page specifies this configuration.

In some implementations, the access of the custom grammars file 615 may depend on the "Inbound" configuration of the interaction page. For example, if the content provider has configured the interaction page to use the custom grammars file as "Application Only," the IVR system 152 may access a version of the custom grammars file 615 that has not been updated by new grammars generated using utterances associated with other interaction sites sharing the custom grammars file 615. Alternatively, if the content provider has configured the interaction page to use the custom grammars file 615 as "Application & Marketplace," the IVR system 152 may access a version of the custom grammars file that has been updated by new grammars generated using utterances associated with other interaction sites sharing the custom grammars file 615.

During state (D), the IVR system 152 processed the transcribed utterance using the custom grammars file 615, and determines that the transcribed utterance cannot be recognized by the custom grammars defined in the custom grammars file 615. In some implementations, in response to determining that the transcribed utterance cannot be recognized by the custom grammars, the IVR system 152 may store the audio portion of the utterance in the utterance store 613. In some implementations, in response to determining that the transcribed utterance cannot be recognized by the custom grammars, the IVR system 152 may store the transcribed utterance in the utterance store 613. In some implementations, in response to determining that the transcribed utterance cannot be recognized by the custom grammars, the IVR system 152 may store both the audio portion and the transcription of the utterance in the utterance store 613. In some implementations, additional metadata or information associated with the utterance may be stored in the utterance store 613. For example, the IVR system 152 may store an identification of the interaction site and/or an identification of the interaction page together with the utterance. User utterances may be collected over time, as one or more communications devices of the communications devices 110*a-n* access the Customer Service Interaction Site. In some implementations, the utterance store 613 may be hosted by the service provider or another service provider remotely from the call handling system 150, but the operations would be similar and not limiting.

During state (E), the grammar generation system 187 generates new custom grammars for the custom grammars file 615 based on the unrecognized utterances. In some implementations, the grammar generation system 187 may access the utterance store 613 at predetermined points of time. For example, at midnight each day, the grammar generation system 187 may query the utterance store 613 to determine whether new utterances have been collected during the previous day. In some implementations, the call handling system 150 may send the new utterances to the grammar generation system 187 to generate new custom grammars. For example, the call handling system 150 may send the new utterances to the grammar generation system 187 to generate new custom grammars if the number of new utterances exceeds a threshold number.

The generation of new custom grammars may be implemented using any existing methods or any combinations of the existing methods of grammars generation in the art. For example, the grammar generation system 187 may be implemented to analyze the utterance "I am not happy with my purchase, and would like to talk to somebody." The grammar generation system 187 may normalize the transcribed utterance to extract keywords in the phrase (e.g., "not happy," "talk to somebody," "somebody," etc.). The grammar generation system 187 may edit the custom grammars file 615 to include one or more variations of the analyzed utterance. In some implementations, the grammar generation system 187 may analyze the statistics of the keywords of analyzed utterances. For example, the grammar generation system 187 may not add the term "somebody" to the custom grammars file 615 unless the number of utterances that include the term "somebody" exceed a predetermined threshold number.

During state (F), the grammar generation system 187 generates an updated custom grammars file 615, and store the updated custom grammars file 615 in the grammar database 189. In some implementations, the storing of the custom grammars file 615 may depend on the "Outbound" configuration of the interaction page. For example, if the content provider has configured the interaction page to use the custom grammars file 615 as "Application Only," the grammar generation system 187 may store a new, private copy of the custom grammars file 615 that is accessible only to the interaction site "Customer Service Interaction Site." Alternatively, if the content provider has configured the interaction page to use the custom grammars file 615 as "Application & Marketplace," the grammar generation system 187 may replace the existing custom grammars file 615 with the updated custom grammars file, such that other interaction sites sharing the custom grammars file may also access the updated custom grammars file. Here, the content provider has configured the "Outbound" option as "Application & Marketplace," so the updated copy of the custom grammars file 615 is updated with new grammars generated using utterances associated with the interaction site "Customer Service Interaction Site."

During state (G), a communications device 110*k* communicates with the call handling system 150 to access a different interaction site "Example Interaction Site 2" that has also been configured to use the custom grammars file 615. For example, a user of the communications device 110*k* may dial a telephone number associated with the Example Interaction Site 2, and the telephone network 120 routes the communications device 110*k* to the call handling system 150. The call handling system 150 may open a new communications port between the communications device 110*k* and the IVR system 152, and the IVR system 152 may execute the interaction flow associated with the Example Interaction Site 2 to establish a communications session with the communications device 110*k*. Although not shown here, in some implementations, the telephone network 120 may route the communications device 110*k* to another call handling system hosted by the service provider. The call handling system would be able to access the utterance store 613 and the grammar database 189 similar to how the call handling system 150 accesses the utterance store 613 and the grammar database 189.

During state (H), the IVR system 152 executes a step of the interaction flow associated with the Example Interaction Site 2, and solicits voice input from the user of the communications device 110*a*. For example, the IVR system 152 may execute an interaction page similar to the "Initial Inquiry" interaction page described in FIG. 4B, where an initial voice prompt asks the user of the communications device 110*k*: "Please tell me the type of service you are calling about." The user may respond by speaking an utterance through a microphone of the communications device 110*a*: "May I talk to somebody in person?" The IVR system 152 receives the utterance, and may use the ASR engine 611 to transcribe the received utterance.

During state (I), the IVR system 152 accesses the custom grammars file to try to identify the service that the user would like to receive. Here, if the content provider has configured the "Inbound" option as "Application & Marketplace," the IVR system 152 may access the \\\custom grammars file 615 with the updated custom grammars. Since the grammar generation system 187 has updated the custom grammars file 615 to include the term "somebody," the IVR system 152 recognizes that the user would like to speak to an agent, and forward the user to a live agent accordingly, as indicated by state (J).

Figure 7A:
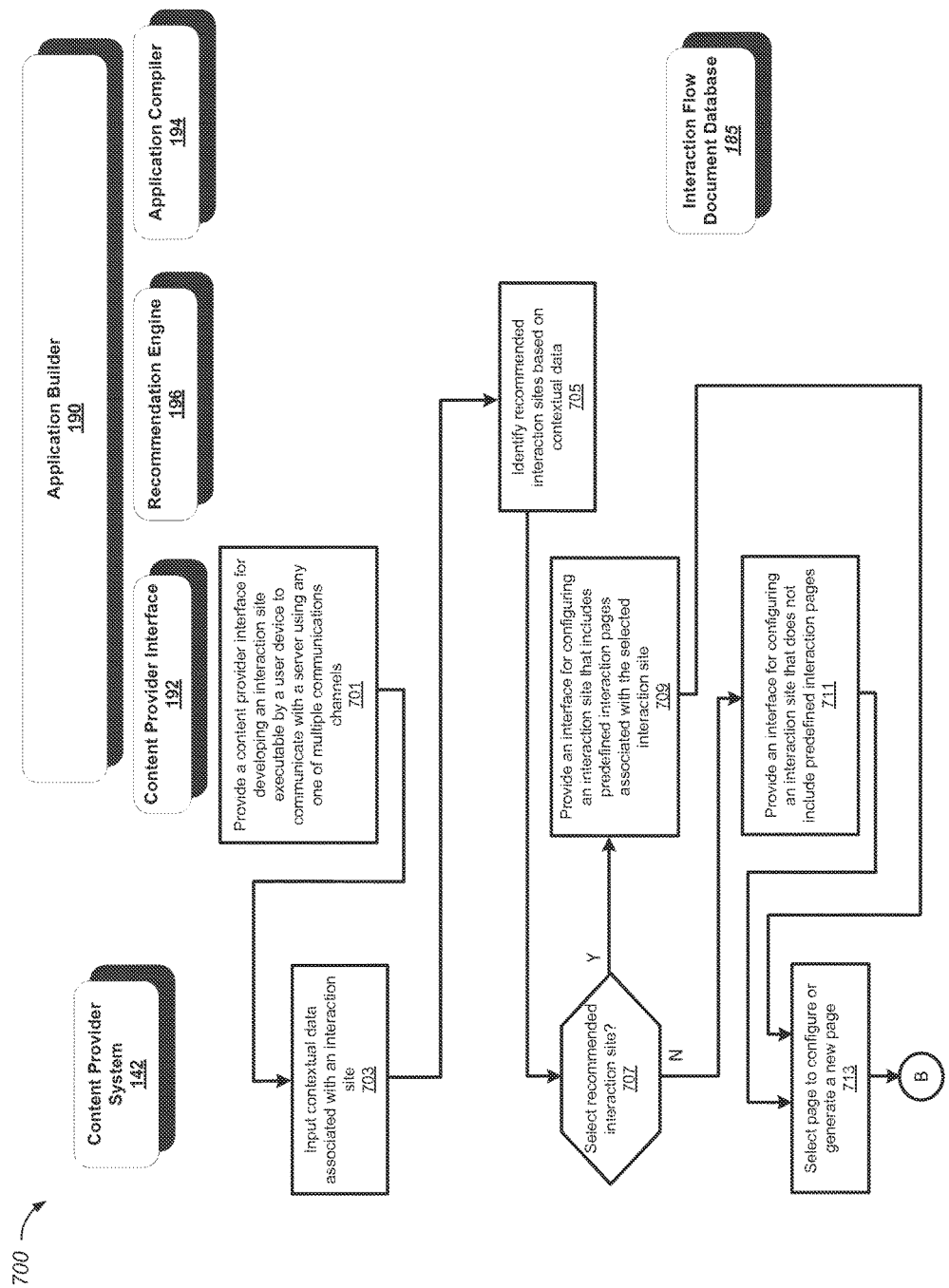
FIGS. 7A and 7B are flow charts illustrating an example of a process for a content provider to create and host an interaction site that utilizes custom grammars.
Figure 7B:
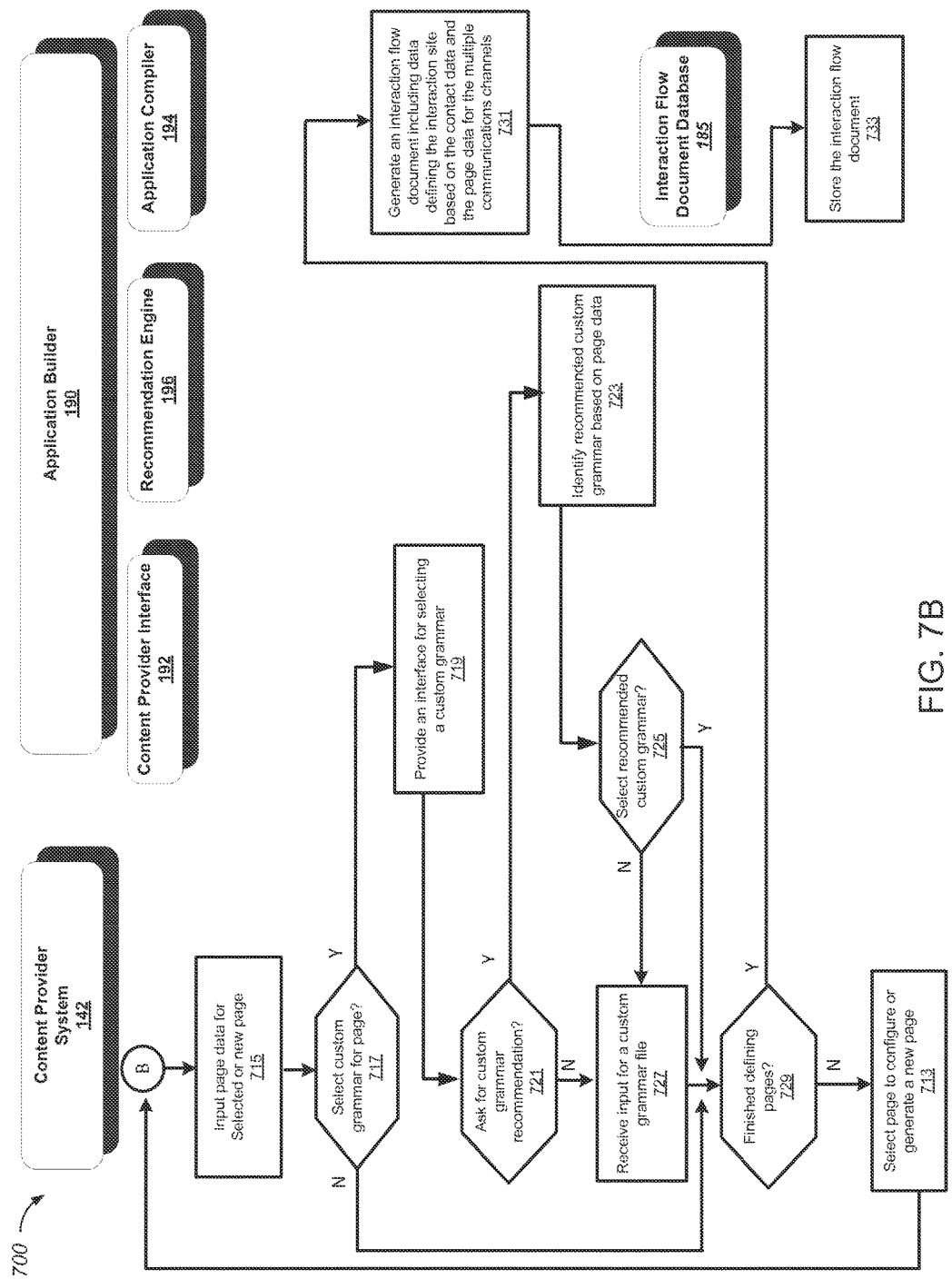

FIGS. 7A and 7B are flow charts illustrating an example of a process 700 for a content provider to create and host an interaction site that uses custom grammars. In general, the process 700 provides a content provider an interface for recommending interaction sites to the content provider for application development, and for designing and creating an interaction site that may be accessed in a multi-channel solution platform. The process 700 is described as being performed by a computer system comprising one or more computers, for example, the communications system 100 shown in FIG. 1.

Referring to FIG. 7A, the application builder 190 provides to the content provider system 142 a content provider interface for developing an interaction site executable by a user device to communicate with a server using any one of multiple communications channels (701). The application builder 190 may include a content provider interface 192. The content provider interface 192 is a GUI front-end for an application development tool that can be used to build an interaction site that is capable of handling interactions using multiple communications channels. The content provider may access the content provider interface 192 over the data network 130.

The content provider system 142 inputs contextual data for each of the enabled multiple communications channels (703). For example, the application builder 190 may provide a GUI similar to the GUI 201 in FIG. 2A, which allows the content provider to input a search query and search for a template interaction site. As another example, the application builder 190 may provide a GUI which prompts the content provider to answer a number to predetermined questions to determine the context of the interaction site.

The application builder 190 identifies one or more recommended interaction sites based on contextual data (705). The application builder 190 may include a recommendation engine 196. For example, the application builder 190 may provide a GUI similar to the GUI 201 in FIG. 2A, which displays the recommended artifacts 219 to the content provider.

The content provider system 142 determines whether an interaction site is selected from the recommended interaction sites (707). If the content provider system 142 selects an interaction site from the recommended interaction sites, the application builder 190 provides an interface for configuring an interaction site that includes predefined interaction pages associated with the selected interaction site (709). For example, the application builder 190 may provide a GUI similar to the GUI 401 in FIG. 4A, which enables the content provider to configure the recommended interaction site. If the content provider system 142 does not select an interaction site from the recommended interaction sites, the application builder 190 provides an interface for configuring an interaction site that does not include predefined interaction pages (711).

The content provider selects a predefined interaction page to configure, or generate a new interaction page (713). For example, in FIG. 4A, the content provider may select any one of the template interaction pages listed in the interaction flow 402 to configure a predefined interaction page, or add a new interaction page.

Referring to FIG. 7B, the content provider inputs page data for the selected or new interaction page (715). For example, the application builder 190 may provide a GUI similar to the GUI 451 in FIG. 4B, which enables the content provider to configure the template interaction page.

The content provider system 142 determines whether custom grammar is selected as a response type from the interaction page (717). For example, the content provider may select a Response Type 413 to be "Custom Grammars" as illustrated in FIG. 4B, which enables the content provider to configure the custom grammars associated with the interaction page.

If the content provider system 142 selects custom grammar as the response type from the interaction page, the application builder 190 provides an interface for selecting a custom grammars file (719). For example, the application builder 190 may provide a GUI similar to the section 417 in FIG. 4B, which enables the content provider to enter, upload, search, and/or ask for recommended custom grammars files.

The content provider system 142 determines whether the content provider has asked for a custom grammar recommendation (721). For example, the content provider may click on the "Recommend" button 414*d* in FIG. 4B, which indicates that the content provider has asked for a custom grammar recommendation.

If the content provider system 142 determines that the content provider has asked for a custom grammar recommendation, the application builder 190 identifies a recommended custom grammars file based on page data (723). For example, the application builder 190 may provide a GUI similar to the list of recommended custom grammars files 418 in FIG. 4G, which enables the content provider to select a recommended custom grammars file or ask for more recommendations.

If the content provider system 142 determines that the content provider has not asked for a custom grammar recommendation, the content provider system 142 receives input for a custom grammars file from the content provider (727). For example, the content provider may enter, upload, or select a custom grammars file based on search, as described in FIGS. 4B-4F.

The content provider system 142 determines whether the content provider has finished defining pages of the interaction site (729). Notably, while not explicitly shown in FIG. 6B, the input of page data for the recommended interaction page also may trigger additional interaction page recommendations in some implementations.

If the content provider has not finished defining the pages of the interaction site, the content provider selects a page from among the site's existing pages to edit (e.g., by modifying the page or deleting the page) or generates a new page (713). If the content provider has finished defining the pages of the interaction site, the application builder 190 generates an interaction flow document including data defining the interaction site based on the contact data and the page data for the multiple communications channels (731). The application builder 190 may include an application compiler 194. In some implementations, the application builder 190 may generate an interaction flow document, which may include XML scripts that correspond to pages (e.g., interaction pages) of an interaction site created by the content provider via the content provider interface.

The application builder 190 then stores the interaction flow document at the interaction flow document database 185 (733). The interaction flow document database 185 stores interaction flow documents created by the application builder 190, and provides the interaction flow processor 180 access to these interaction flow documents.

Figure 8:
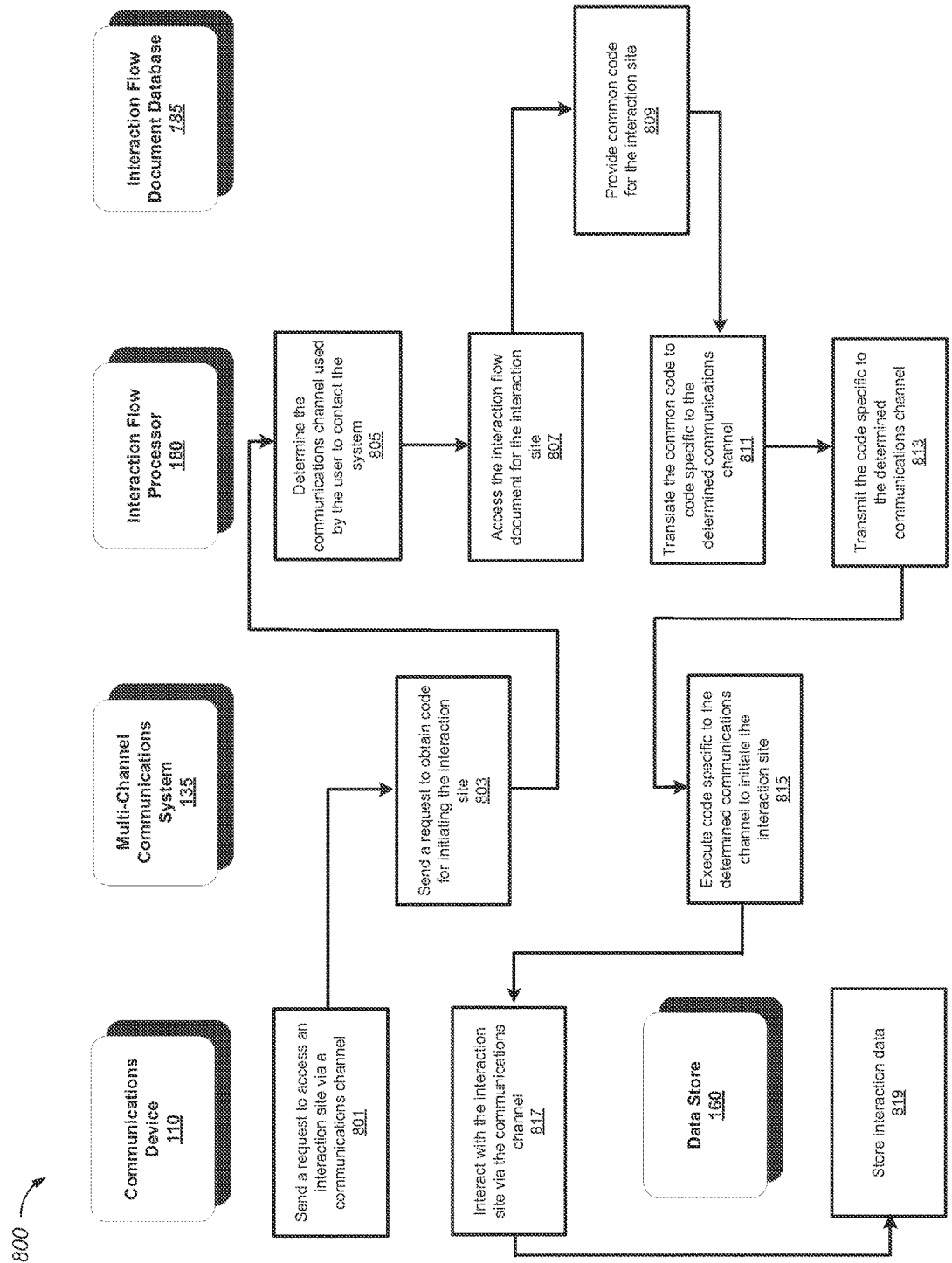
FIG. 8 is a flow chart illustrating an example of a process for a user to communicate with a multi-channel communications system and access an interaction site via a communications channel.

FIG. 8 is a flow chart illustrating an example of a process 800 for a user to communicate with a multi-channel communications system and access an interaction site via a communications channel. In general, the process 800 provides a communications device access to an interaction site using a communications channel of a user's choice. The process 800 is described as being performed by a computer system comprising one or more computers, for example, the communications system 100 shown in FIG. 1.

The communications device 110 sends a request to access an interaction site via a particular communications channel (801). A user of the communications device (e.g., a smart phone) 110 is able to interact with the communications device 110 to request a service from an interaction site that is provided by a content provider using a communications channel. For example, the user may indicate a desire to request a service by contacting the multi-channel communications system 135 in any of multiple different ways. For example, the user may call a telephone number, send an SMS message, enter into a chat session, or send an email.

The multi-channel communications system 135 receives the request from communications device 110, and sends a request to the interaction flow processor 180 to obtain code for initiating the interaction site (803). Depending on the communications channel the communications device 110 is using, the request is received by a handling system in the multi-channel communications system 135. For example, if the user of the communications device 110 calls a phone number to reach the interaction site, the call handling system 150 will receive the phone call. Based on the contact information received by the multi-channel communications system 135, the corresponding handling system sends a request to the interaction flow processor 180 for the scripts for executing the interaction site. The request sent by the multi-channel communications system 135 to the interaction flow processor 180 may include an interaction site identifier (e.g., a unique interaction site identifier) that may be used by the interaction flow processor 180 to identify the desired interaction site. In some implementations, the multi-channel communications system 135 may send a request for the scripts for executing the entire flow of the interaction site. In other implementations, the multi-channel communications system 135 may send a request for the scripts for executing a particular state of the flow (e.g., a state corresponding to executing a single page or executing a subset of the pages of the interaction site), rather than the entire flow.

The interaction flow processor 180 identifies the communications channel used by the user to contact the system (805). In some implementations, the communications channel may be included in the request sent by the multi-channel communications system 135. In some implementations, the communications channel may be determined by the interaction flow processor 180 based on the identifier of the handling system. For example, the identifier may be an IP address of the handling system. As another example, the identifier may be metadata embedded in the request to the interaction flow processor 180.

The interaction flow processor 180 accesses the interaction flow document for the interaction site (807). Based on the interaction site that the multi-channel communications system 135 has requested, the interaction flow processor 180 accesses the interaction flow document stored in the interaction flow document database 185. The interaction flow document database 185 then provides the common code for the interaction site (809). In some implementations, the common code may be XML scripts.

The interaction flow processor 180 translates the common code to code specific to the determined communications channel (811). Based on the communications channel that the communications device 110 is using, the interaction flow processor 180 translates the scripts in the interaction flow document to a specific language that the handling system can execute. For example, if the handling system is the call handling system 150, the interaction flow processor 180 translates the scripts from XML scripts to VoiceXML scripts. In some implementations, the translation may include adding parameters specific to a type of communications channel in the translated scripts. For example, if the handling system is the call handling system 150, the interaction flow processor 180 may add information specific to ASR resource selection in the translated scripts. The interaction flow processor 180 then transmits the translated code that is specific to the determined communications channel to the multi-channel communications system 135 (813).

The multi-channel communications system 135 executes code specific to the determined communications channel to initiate the interaction site between the multi-channel communications system 135 and the communications device 110 (815). The communications device 110 then interacts with the interaction site via the communications channel (817). Notably, if the interaction site is an enhanced interaction site (i.e., a site that includes one or more multimodal action pages), the communication device 110 may interact with the interaction site via the standard communications mode (e.g., text) of the communications channel (e.g., chat) and, in at least some portions of the interaction flow, via one or more additional communication modes (e.g., video and audio). As stated previously, multimodal action pages are described in greater detail in application Ser. No. application Ser. No. 13/092,090, which is incorporated herein by reference for all purposes.

The communications device 110 transmits interaction data to the data store 160, and the data store 160 stores the interaction data (819). In some implementations, the recommendation engine 196 may access the interaction data to recommend artifacts to content providers. For example, the recommendation engine 196 may only recommend interaction sites that satisfy a certain call drop threshold. As another example, the recommendation engine 196 may only recommend interaction sites that satisfy a certain customer satisfaction threshold. As another example, the recommendation engine 196 may only recommend interaction sites that have been accessed by a threshold number of callers.

Figure 9:
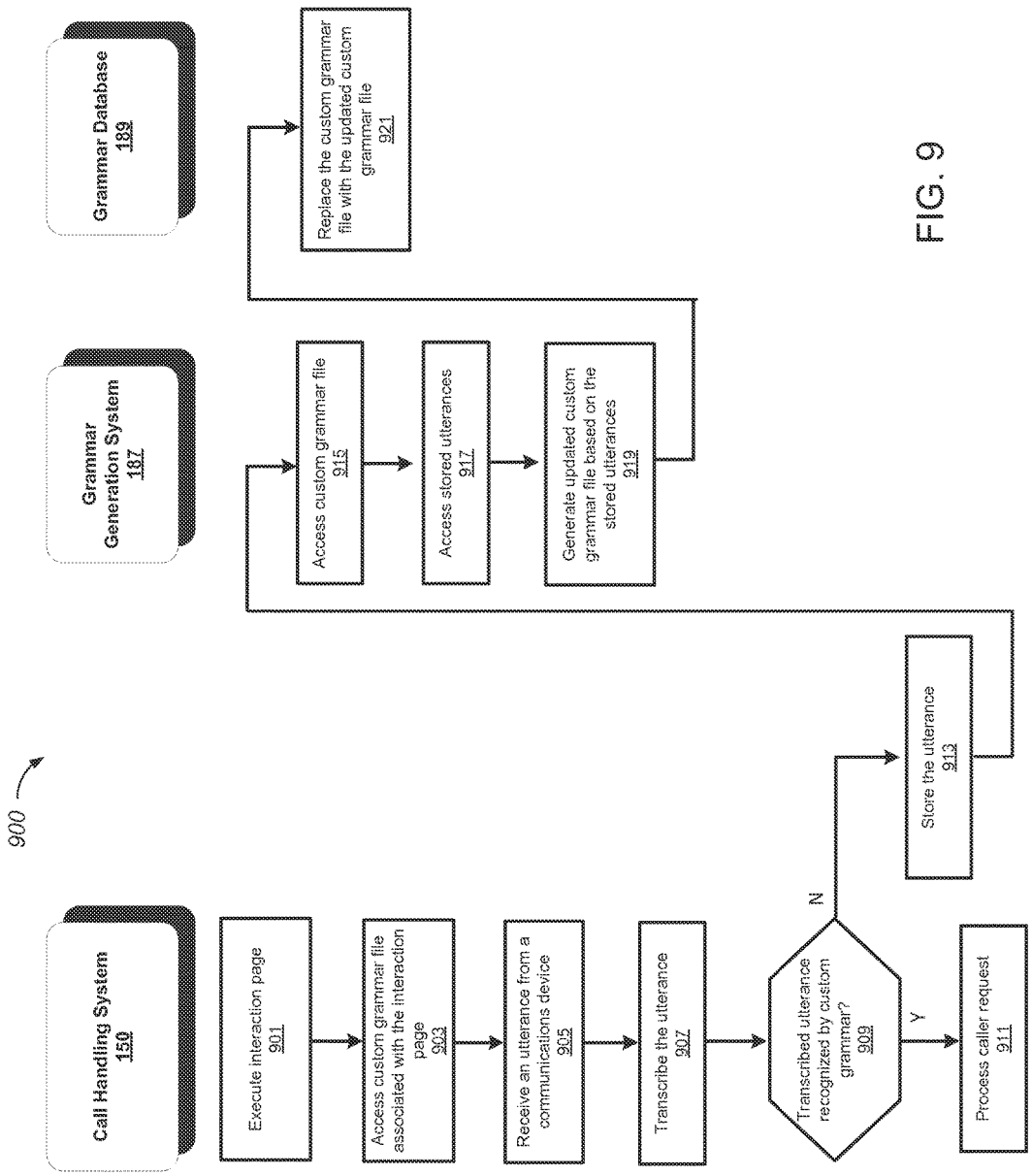
FIG. 9 is a flow chart illustrating an example of a process for a grammar generation system to communicate with a multi-channel communications system and generate updated custom grammars.

FIG. 9 is a flow chart illustrating an example of a process 900 for a grammar generation system to communicate with a multi-channel communications system and generate updated custom grammars. In general, the process 900 enables a computer system to collect data associated with utterances and generate updated custom grammars. The process 900 is described as being performed by a computer system comprising one or more computers, for example, the communications systems 100 and 600 shown in FIGS. 1 and 6.

The call handling system 150 executes an interaction page of an interaction site (901). The call handling system 150 may receive a request to execute an interaction site associated with a custom grammars file, the interaction site enabling communications between the user device and the communications system over any of multiple communications channels, including an interactive voice response (IVR) channel. For example, as described in FIG. 6, a user of the communications device 110 may dial a telephone number associated with an interaction site, and the telephone network 120 routes the communications device 110 to the call handling system 150. The call handling system 150 may open a communications port between the communications device 110 and the IVR system 152. The IVR system 152 may then access an interaction flow document to execute a first interaction page of the interaction site.

The interaction page may have been configured by the content provider to use a custom grammars file. When the IVR system 152 executes the interaction page, the IVR system 152 may access the custom grammars file that is configured to enable the IVR system 152 to identify executable commands corresponding to utterances spoken by users of communications devices.

The call handling system 150 accesses a custom grammars file associated with the interaction page (903). For example, as described in FIG. 6, the IVR system 152 may transcribe the utterance using speech resources (e.g., an ASR engine). In some implementations, the access of the custom grammars file may depend on the "Inbound" configuration of the interaction page. The call handling system 150 determines whether the transcribed utterance is recognized by custom grammars in the custom grammars file (909). In some implementations, the IVR system 152 may process the transcribed utterances, and determine whether there is a match between the processed transcription and the terms defined in the custom grammars file. For example, if the transcribed utterance is "I would like to talk to somebody," the IVR system 152 may determine whether there is a match between the terms defined in the custom grammars file and the processed terms "I would like to talk to somebody," "talk to somebody," or "somebody."

If the call handling system 150 determines that the transcribed utterance is recognized by custom grammars in the custom grammars file, the call handling system 150 processes the request of the caller operating the communications device (911). For example, if "somebody" is defined in the custom grammars file as "routing call to a live agent," the IVR system 152 may route the user of the communications device 110 to an agent in the call center 154.

If the call handling system 150 determines that the transcribed utterance is not recognized by custom grammars in the custom grammars file, the call handling system 150 stores the utterance (913). For example, as described in FIG. 6, in response to determining that the transcribed utterance cannot be recognized by the custom grammars, the IVR system 152 may store the transcribed utterance in the utterance store 613 in various forms and/or formats.

The grammar generation system 187 accesses the custom grammars file (915). For example, the grammar generation system 187 may access the custom grammars file in the grammar database 189.

The grammar generation system 187 accesses the stored utterances (917). For example, the grammar generation system 187 may access the stored utterances in the utterance store 613. As described in FIG. 6, in some implementations, the grammar generation system 187 may pull stored utterances from the utterance store 613. In some other implementations, the call handling system 150 may push utterances stored in the utterance store 613 to the grammar generation system 187.

The grammar generation system 187 generates an updated custom grammars file based on the stored utterances (919).

For example, as described in FIG. 6, the grammar generation system 187 generates new custom grammars based on stored utterances.

The grammar database updates the custom grammars file with the updated custom grammars file (921). For example, as described in FIG. 6, the grammar generation system 187 stores the updated custom grammars file in the grammar database 189 based on the "Outbound" configuration of the interaction page. For example, if the "Outbound" configuration is configured as "Application Only," the grammar database 189, the grammar database 189 stores a private custom grammars file in the grammar database 189, where the private custom grammars file is accessible to one or more communications systems executing the interaction site associated with the custom grammars file, and the private custom grammars file is not accessible to one or more communications systems executing other interaction sites associated with the custom grammars file. Alternatively, if the "Outbound" configuration is configured as "Application & Marketplace," the grammar generation system 187 may replace the existing custom grammars file with an updated custom grammars file, such that other communications systems executing other interaction sites that share the custom grammars file may also access the updated custom grammars file.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

An "engine" (or "software engine") may refer to a software implemented input/output system that provides an output that is different from the input. An engine can be an encoded block of functionality, such as a library, a platform, a Software Development Kit ("SDK"), a software module, or an object.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method, comprising:
   receiving, from a user device and by a communications system, a request to execute an interaction site of a plurality of interaction sites being associated with a plurality of corresponding applications and corresponding custom grammars files, the interaction site enabling communications between the user device and the communications system over any of multiple communications channels, including an interactive voice response (IVR) channel and a custom grammars file corresponding to the interaction site specifying executable commands specific to the interaction site and being configured to enable the communications system to identify the specific executable commands to control the interaction site;
   accessing, by the communications system, an interaction flow document to execute the interaction site;
   accessing, by the communications system, the custom grammars file, the custom grammars file being configured to enable the communications system to recognize utterances that are specific to the interaction site spoken by users of user devices;
   receiving, from the user device and by the communications system, an utterance spoken by a user of the user device;
   transcribing, by the communication system, the utterance to a transcribed utterance;
   determining, by the communication system, whether the transcribed utterance is recognized based on the custom grammars file;
   in response to determining that the transcribed utterance is not recognized based on the custom grammars file:
      storing, by the communications system, the utterance; and
      updating, by a grammar generation system, the custom grammars file to include a representation of the stored utterance for processing utterances in subsequent communications with users;
   determining, by the communications system, a configuration parameter for the interaction site that specifies a sharing option for the custom grammars file;
   conditioned on determining that the configuration parameter specifies sharing the custom grammars file with other interaction sites, enabling the updated custom grammars file to be accessible by other interaction sites; and
   conditioned on determining that the configuration parameter specifies limiting the custom grammars file for use by the interaction site, storing the updated custom grammars file for private use by the interaction site.

2. The method of claim 1, wherein updating the custom grammars file comprises:
   storing the custom grammars file in a grammar database, and wherein enabling the updated custom grammars file to be accessible by other interaction sites comprises enabling the custom grammars file in the grammar database to be accessible by one or more communications systems executing one or more interaction sites associated with the custom grammars file.

3. The method of claim 2, wherein enabling the updated custom grammars file to be accessible by other interaction sites comprises:
  receiving, from a second user device and by the communications system, a request to execute a second interaction site associated with the custom grammars file; and
  accessing, by the communications system, the custom grammars file in the grammar database, the custom grammars file being updated by the grammar generation system to include the representation of the utterance.

4. The method of claim 1, wherein storing the updated custom grammars file for private use by the interaction site comprises:
  generating, by the grammar generation system, a private custom grammars file for the interaction site; and
  storing the private custom grammars file in a grammar database, the private custom grammars file being accessible to one or more communications systems executing the interaction site associated with the custom grammars file and not being accessible to one or more communications systems executing other interaction sites associated with the custom grammars file.

5. The method of claim 1, wherein receiving a request to execute an interaction site comprises:
  receiving a first request to execute a first interaction page of the interaction site, wherein the first interaction page is associated with the custom grammars file; and
  receiving a second request to execute a second interaction page of the interaction site, wherein the second interaction page is associated with a second custom grammars file.

6. The method of claim 1, wherein storing the utterance comprises:
  determining that a command associated with the transcribed utterance is not recognized by the communications system using the custom grammars file; and
  in response to determining that the command is not recognized by the communications system using the custom grammars file, storing the utterance.

7. The method of claim 1, wherein the custom grammars file includes Grammar Extensible Markup Language (GRXML) scripts configured to identify a command associated with the utterance spoken by the user.

8. The method of claim 1, wherein the interaction flow document includes XML scripts that correspond to interaction pages of the interaction site.

9. The method of claim 1, wherein the multiple communications channels further include at least one of a SMS channel, a chat channel, and an email channel.

10. A computer-implemented system comprising:
  one or more processors and one or more non-transitory computer-readable storage devices storing instructions that, when executed by the one or more processors, cause the one or more processors to perform operations comprising:
    receiving, from a user device, a request to execute an interaction site of a plurality of interaction sites being associated with a plurality of corresponding applications and corresponding custom grammars files, the interaction site enabling communications between the user device and a communications system over any of multiple communications channels, including an interactive voice response (IVR) channel and a custom grammars file corresponding to the interaction site specifying executable commands specific to the interaction site and being configured to enable the communications system to identify the specific executable commands to control the interaction site;
    accessing an interaction flow document to execute the interaction site;
    accessing the custom grammars file, the custom grammars file being configured to enable the communications system to recognize utterances that are specific to the interaction site spoken by users of user devices;
    receiving, from the user device, an utterance spoken by a user of the user device;
    transcribing the utterance to a transcribed utterance;
    determining whether the transcribed utterance is recognized based on the custom grammars file;
    in response to determining that the transcribed utterance is not recognized based on the custom grammars file:
      storing the utterance; and
      updating the custom grammars file to include a representation of the stored utterance for processing utterances in subsequent communications with users;
    determining a configuration parameter for the interaction site that specifies a sharing option for the custom grammars file;
    conditioned on determining that the configuration parameter specifies sharing the custom grammars file with other interaction sites, enabling the updated custom grammars file to be accessible by other interaction sites; and
    conditioned on determining that the configuration parameter specifies limiting the custom grammars file for use by the interaction site, storing the updated custom grammars file for private use by the interaction site.

11. The system of claim 10, wherein updating the custom grammars file comprises:
  storing the custom grammars file in a grammar database, and wherein enabling the updated custom grammars file to be accessible by other interaction sites comprises enabling the custom grammars file in the grammar database to be accessible by one or more communications systems executing one or more interaction sites associated with the custom grammars file.

12. The system of claim 11, wherein enabling the updated custom grammars file to be accessible by other interaction sites comprises:
  receiving, from a second user device, a request to execute a second interaction site associated with the custom grammars file; and
  accessing the custom grammars file in the grammar database, the custom grammars file being updated to include the representation of the utterance.

13. The system of claim 10, wherein storing the updated custom grammars file for private use by the interaction site comprises:
  generating a private custom grammars file for the interaction site; and the operations further comprise storing the private custom grammars file in a grammar database, the private custom grammars file being accessible to one or more communications systems executing the interaction site associated with the custom grammars file and not being accessible to one or more communications systems executing other interaction sites associated with the custom grammars file.

14. The system of claim 10, wherein receiving a request to execute an interaction site comprises:
  receiving a first request to execute a first interaction page of the interaction site, wherein the first interaction page is associated with the custom grammars file; and receiving a second request to execute a second interaction page of the interaction site, wherein the second interaction page is associated with a second custom grammars file.

15. The system of claim 10, wherein storing the utterance comprises:
determining that a command associated with the transcribed utterance is not recognized by the communications system using the custom grammars file; and
in response to determining that the command is not recognized by the communications system using the custom grammars file, storing the utterance.

16. A system comprising:
a communications system configured to:
receive, from a user device, a request to execute an interaction site of a plurality of interaction sites being associated with a plurality of corresponding applications and corresponding custom grammars files, the interaction site enabling communications between the user device and the communications system over any of multiple communications channels, including an interactive voice response (IVR) channel and a custom grammars file corresponding to the interaction site specifying executable commands specific to the interaction site and being configured to enable the communications system to identify the specific executable commands to control the interaction site;
access an interaction flow document to execute the interaction site;
access the custom grammars file, the custom grammars file being configured to enable the communications system to recognize the utterances that are specific to the interaction site spoken by users of user devices;
receive, from the user device, an utterance spoken by a user of the user device;
transcribe the utterance to a transcribed utterance;
determine whether the transcribed utterance is recognized based on the custom grammars file; and
in response to determining that the transcribed utterance is not recognized based on the custom grammars file, store the utterance; and
a grammar generation system configured to:
update the custom grammars file to include a representation of the utterance stored by the communications system for processing utterances in subsequent communications with users,
wherein the communications system is further configured to:
determine a configuration parameter for the interaction site that specifies a sharing option for the custom grammars file;
conditioned on determining that the configuration parameter specifies sharing the custom grammars file with other interaction sites, enable the updated custom grammars file to be accessible by other interaction sites; and
conditioned on determining that the configuration parameter specifies limiting the custom grammars file for use by the interaction site, store the updated custom grammars file for private use by the interaction site.

17. The system of claim 16, comprising:
the user device configured to:
send the request to the communications system to execute the interaction site associated with the custom grammars file; and
send the utterance spoken by the user to the communications system.

18. The system of claim 17, comprising:
a second user device configured to:
send a request to the communications system to execute a second interaction site associated with the custom grammars file, and
wherein the communications system is further configured to:
update the custom grammars file by storing the custom grammars file in a grammar database, the custom grammars file in the grammar database being accessible to one or more communications systems executing one or more interaction sites associated with the custom grammars file;
receive, from the second user device, the request to execute the second interaction site associated with the custom grammars file; and
access the custom grammars file in a grammar database, the custom grammars file being updated by the grammar generation system to include the representation of the utterance.

19. The system of claim 16, wherein the communications system is configured to store the utterance including:
determining that a command associated with the transcribed utterance is not recognized by the communications system using the custom grammars file; and
in response to determining that the command is not recognized by the communications system using the custom grammars file, storing the utterance.

20. The system of claim 16, wherein the custom grammars file includes Grammar Extensible Markup Language (GRXML) scripts configured to identify a command associated with the utterance spoken by the user.

21. The method of claim 1, wherein updating the custom grammars file to include the representation of the stored utterance for processing utterances in subsequent communications with users comprises:
determining a number of occurrences of the utterance in user speech;
comparing the number of occurrence to a threshold value; and
conditioned on the number of occurrences exceeding the threshold value, adding the representation of the stored utterance to the custom grammars file.

* * * * *

UNITED STATES PATENT AND TRADEMARK OFFICE
CERTIFICATE OF CORRECTION

PATENT NO. : 10,063,701 B2  
APPLICATION NO. : 14/290446  
DATED : August 28, 2018  
INVENTOR(S) : Praphul Kumar et al.

Page 1 of 1

It is certified that error appears in the above-identified patent and that said Letters Patent is hereby corrected as shown below:

In the Claims

Column 42, Line 51, Claim 21  Delete "occurrence" and insert -- occurrences --

Signed and Sealed this  
Tenth Day of September, 2019

Andrei Iancu  
*Director of the United States Patent and Trademark Office*